US012659419B2

(12) United States Patent
Wang et al.

(10) Patent No.: US 12,659,419 B2
(45) Date of Patent: Jun. 16, 2026

(54) AUGMENTED REALITY SELF-PORTRAITS

(71) Applicant: Apple Inc., Cupertino, CA (US)

(72) Inventors: Xiaohuan Corina Wang, Los Altos, CA (US); Zehang Sun, Saratoga, CA (US); Joe Weil, Greenbrae, CA (US); Omid Khalili, Santa Clara, CA (US); Stuart Mark Pomerantz, Stevenson Ranch, CA (US); Marc Robins, Minneapolis, MN (US); Toshihiro Horie, San Jose, CA (US); Eric Beale, Los Angeles, CA (US); Nathalie Castel, Sunnyvale, CA (US); Jean-Michel Berthoud, San Jose, CA (US); Brian Walsh, Sunnyvale, CA (US); Kevin O'Neil, San Francisco, CA (US); Andy Harding, Portola Valley, CA (US); Greg Dudey, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 733 days.

(21) Appl. No.: 17/861,086

(22) Filed: Jul. 8, 2022

(65) Prior Publication Data

US 2022/0353432 A1 Nov. 3, 2022

Related U.S. Application Data

(62) Division of application No. 16/124,168, filed on Sep. 6, 2018, now Pat. No. 11,394,898.

(Continued)

(51) Int. Cl.
*H04N 5/265* (2006.01)
*G06T 7/11* (2017.01)
(Continued)

(52) U.S. Cl.
CPC .............. *H04N 5/265* (2013.01); *G06T 7/11* (2017.01); *G06T 7/13* (2017.01); *G06T 7/174* (2017.01);
(Continued)

(58) Field of Classification Search
CPC ...... H04N 5/265; H04N 5/2226; H04N 5/272; H04N 5/44504; H04N 23/62; H04N 23/63;
(Continued)

(56) References Cited

U.S. PATENT DOCUMENTS 6,556,704 B1 4/2003 Chen
8,339,418 B1 12/2012 Nesmith et al.
(Continued)

FOREIGN PATENT DOCUMENTS

CN 105031919 11/2015
CN 105005992 3/2016
(Continued)

OTHER PUBLICATIONS

Greig et al., "Exact maximum a posteriori estimation for binary images," Journal of the Royal Statistical Society Series B, 1989, 51: 271-279.
(Continued)

*Primary Examiner* — Oneal R Mistry
*Assistant Examiner* — Jongbong Nah
(74) *Attorney, Agent, or Firm* — Fish & Richardson P.C.

(57) ABSTRACT

Systems, methods, apparatuses and non-transitory, computer-readable storage mediums are disclosed for generating AR self-portraits or "AR selfies." In an embodiment, a method comprises: capturing, by a first camera of a mobile device, live image data, the live image data including an image of a subject in a physical, real-world environment; receiving, by a depth sensor of the mobile device, depth data
(Continued)

indicating a distance of the subject from the camera in the physical, real-world environment; receiving, by one or more motion sensors of the mobile device, motion data indicating at least an orientation of the first camera in the physical, real-world environment; generating a virtual camera transform based on the motion data, the camera transform for determining an orientation of a virtual camera in a virtual environment; and generating a composite image data, using the image data, a matte and virtual background content selected based on the virtual camera orientation.

21 Claims, 24 Drawing Sheets

Related U.S. Application Data

(60) Provisional application No. 62/556,297, filed on Sep. 8, 2017.

(51) Int. Cl.

| | |
|---|---|
| *G06T 7/13* | (2017.01) |
| *G06T 7/174* | (2017.01) |
| *G06T 7/194* | (2017.01) |
| *G06T 7/50* | (2017.01) |
| *G06T 11/60* | (2026.01) |
| *G06T 13/80* | (2011.01) |
| *G06T 15/50* | (2011.01) |
| *G06T 17/20* | (2006.01) |
| *H04N 5/222* | (2006.01) |
| *H04N 5/232* | (2006.01) |
| *H04N 5/247* | (2006.01) |
| *H04N 5/272* | (2006.01) |
| *H04N 5/445* | (2011.01) |
| *H04N 23/62* | (2023.01) |
| *H04N 23/63* | (2023.01) |
| *H04N 23/68* | (2023.01) |
| *H04N 23/80* | (2023.01) |
| *H04N 23/90* | (2023.01) |
| *H04N 23/951* | (2023.01) |
| *G06T 5/20* | (2006.01) |
| *G06T 5/70* | (2024.01) |
| *G06T 5/77* | (2024.01) |
| *G06T 7/136* | (2017.01) |
| *G06T 7/187* | (2017.01) |
| *G06T 15/20* | (2011.01) |
| *G06T 19/00* | (2011.01) |
| *H04N 5/76* | (2006.01) |
| *H04N 5/77* | (2006.01) |

(52) U.S. Cl.
CPC .............. *G06T 7/194* (2017.01); *G06T 7/50* (2017.01); *G06T 11/60* (2013.01); *G06T 13/80* (2013.01); *G06T 15/503* (2013.01); *G06T 17/20* (2013.01); *H04N 5/2226* (2013.01); *H04N 5/272* (2013.01); *H04N 5/44504* (2013.01); *H04N 23/62* (2023.01); *H04N 23/63* (2023.01); *H04N 23/631* (2023.01); *H04N 23/6812* (2023.01); *H04N 23/80* (2023.01); *H04N 23/90* (2023.01); *H04N 23/951* (2023.01); *G06T 5/20* (2013.01); *G06T 5/70* (2024.01); *G06T 5/77* (2024.01); *G06T 7/136* (2017.01); *G06T 7/187* (2017.01); *G06T 15/20* (2013.01); *G06T 19/006* (2013.01); *G06T 2200/24* (2013.01); *G06T 2207/10016* (2013.01); *G06T 2207/10028* (2013.01); *G06T 2207/20076* (2013.01); *G06T 2207/20221* (2013.01); *G06T 2207/30201* (2013.01); *H04N 5/76* (2013.01); *H04N 5/772* (2013.01)

(58) Field of Classification Search
CPC .. H04N 23/631; H04N 23/6812; H04N 23/80; H04N 23/90; H04N 5/76; H04N 5/772; H04N 23/951; G06T 7/11; G06T 7/13; G06T 7/174; G06T 7/194; G06T 7/50; G06T 11/60; G06T 13/80; G06T 15/503; G06T 17/20; G06T 5/20; G06T 5/70; G06T 5/77; G06T 7/136; G06T 7/187; G06T 15/20; G06T 19/006; G06T 2200/24; G06T 2207/10016; G06T 2207/10028; G06T 2207/20076; G06T 2207/20221; G06T 2207/30201
See application file for complete search history.

(56) References Cited

U.S. PATENT DOCUMENTS

| | | | |
|---|---|---|---|
| 9,237,244 B2 | 1/2016 | Silverbrook | |
| 9,432,625 B2 | 8/2016 | Delegue et al. | |
| 9,584,729 B2 | 2/2017 | Amtrup et al. | |
| 10,839,577 B2 | 11/2020 | Horie et al. | |
| 11,394,898 B2 | 7/2022 | Wang et al. | |
| 2007/0133880 A1 | 6/2007 | Sun | |
| 2008/0307307 A1 | 12/2008 | Ciudad et al. | |
| 2009/0315915 A1* | 12/2009 | Dunn | H04N 5/272 |
| | | | 345/632 |
| 2010/0302376 A1 | 12/2010 | Boulanger | |
| 2011/0211749 A1 | 9/2011 | Tan | |
| 2011/0285910 A1 | 11/2011 | Bamji | |
| 2012/0306904 A1 | 12/2012 | Francois et al. | |
| 2013/0230237 A1 | 9/2013 | Schlosser | |
| 2013/0265382 A1* | 10/2013 | Guleryuz | G06T 11/60 |
| | | | 348/14.08 |
| 2014/0002746 A1* | 1/2014 | Bai | G06T 7/11 |
| | | | 348/E5.077 |
| 2014/0003719 A1* | 1/2014 | Bai | G06T 7/269 |
| | | | 382/173 |
| 2014/0036108 A1 | 2/2014 | Yoon et al. | |
| 2014/0294288 A1 | 10/2014 | Nguyen et al. | |
| 2014/0354690 A1* | 12/2014 | Walters | G06T 19/003 |
| | | | 345/633 |
| 2015/0161818 A1 | 6/2015 | Komenczi et al. | |
| 2015/0254868 A1* | 9/2015 | Srikanth | H04N 23/61 |
| | | | 348/47 |
| 2015/0269740 A1 | 9/2015 | Mazurenko | |
| 2015/0348326 A1 | 12/2015 | Sanders et al. | |
| 2016/0050169 A1 | 2/2016 | Atar et al. | |
| 2016/0057363 A1 | 2/2016 | Posa | |
| 2016/0073040 A1 | 3/2016 | Jen | |
| 2016/0284096 A1 | 9/2016 | Buford et al. | |
| 2016/0343166 A1 | 11/2016 | Inoko et al. | |
| 2017/0085834 A1 | 3/2017 | Kim et al. | |
| 2017/0124717 A1* | 5/2017 | Baruch | G06T 7/136 |
| 2017/0244908 A1 | 8/2017 | Flack | |
| 2018/0249062 A1 | 8/2018 | Jin et al. | |
| 2019/0035125 A1 | 1/2019 | Bellows et al. | |
| 2019/0080498 A1 | 3/2019 | Horie | |
| 2019/0082118 A1 | 3/2019 | Wang | |
| 2019/0340432 A1 | 11/2019 | Mousavian | |

FOREIGN PATENT DOCUMENTS

| | | |
|---|---|---|
| CN | 105265001 | 3/2016 |
| CN | 105407346 | 3/2016 |
| CN | 106162137 | 11/2016 |
| WO | WO 2016183629 | 11/2016 |
| WO | WO 2018130909 | 7/2018 |

OTHER PUBLICATIONS

International Invitation to Pay Additional Fees and, Where Applicable, Protest Fees, in International Application No. PCT/US2018/049930, mailed Dec. 12, 2018, 5 pages.

(56) References Cited

OTHER PUBLICATIONS

International Search Report and Written Opinion in International Application No. PCT/US2018/049930, mailed Feb. 11, 2019, 21 pages.
PCT International Preliminary Report on Patentability in International Appln. No. PCT/US2018/049930, dated Mar. 19, 2020, 14 pages.
Suzuki and Abe, "Topological Structural Analysis of Digitized Binary Images by Border Following," CVGIP, 1985, 32-46.
Wang et al., "Automatic Real-Time Video Matting Using Time-of-Flight Camera and Multichannel Poisson Equations," Int. J. Comput. Vis., 2012, 97: 104-121.
Hao, "Photography and Dynamic Masking in Virtual Cinema Production," Advanced Motion Picture Technology, Jan. 11, 2016, China Academic Journal Electronic Publishing House, 10 pages (with machine translation).
Zhu et al., "Targeting Accurate Object Extraction From an Image: A Comprehensive Study of Natural Image Matting," IEEE Transactions on Neural Networks and Learning Systems, Nov. 20, 2014, 26(2):185-207.

* cited by examiner

620

621

622 d

LEFT

DISTANCES d $\mu-\sigma$    $\mu$    $\mu+\sigma$

RIGHT

DISTANCES d $\mu-\sigma$    $\mu$    $\mu+\sigma$

623

626

$$p(x|\lambda)=\sum_{i=1}^{M} w_i \, g(x|\mu_i, \Sigma_i),$$

M GAUSSIAN FOR
BACKGROUND PIXELS

M GAUSSIAN FOR
FOREGROUND PIXELS

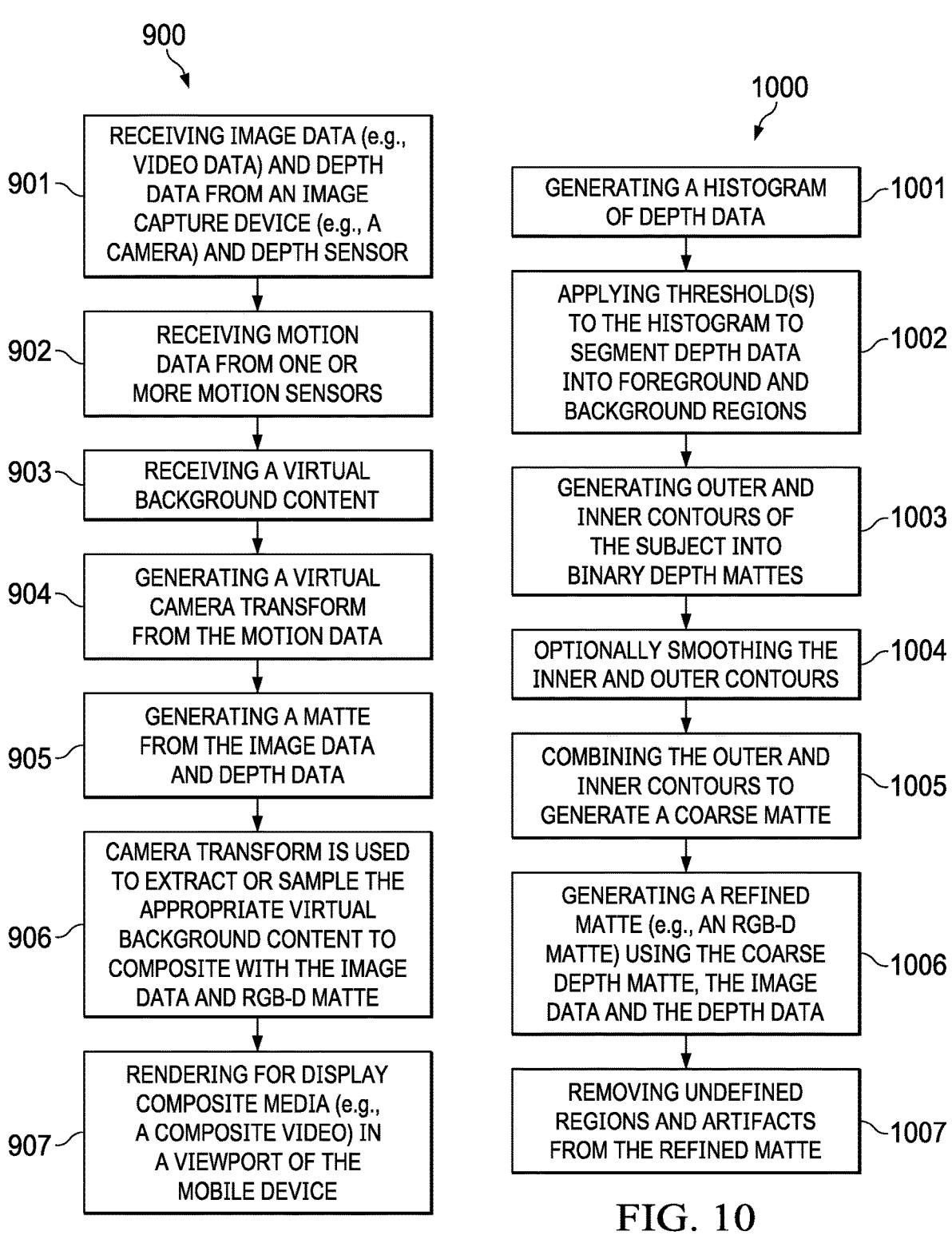

900

901 — RECEIVING IMAGE DATA (e.g., VIDEO DATA) AND DEPTH DATA FROM AN IMAGE CAPTURE DEVICE (e.g., A CAMERA) AND DEPTH SENSOR

902 — RECEIVING MOTION DATA FROM ONE OR MORE MOTION SENSORS

903 — RECEIVING A VIRTUAL BACKGROUND CONTENT

904 — GENERATING A VIRTUAL CAMERA TRANSFORM FROM THE MOTION DATA

905 — GENERATING A MATTE FROM THE IMAGE DATA AND DEPTH DATA

906 — CAMERA TRANSFORM IS USED TO EXTRACT OR SAMPLE THE APPROPRIATE VIRTUAL BACKGROUND CONTENT TO COMPOSITE WITH THE IMAGE DATA AND RGB-D MATTE

907 — RENDERING FOR DISPLAY COMPOSITE MEDIA (e.g., A COMPOSITE VIDEO) IN A VIEWPORT OF THE MOBILE DEVICE

GENERATING A HISTOGRAM OF DEPTH DATA — 1001

APPLYING THRESHOLD(S) TO THE HISTOGRAM TO SEGMENT DEPTH DATA INTO FOREGROUND AND BACKGROUND REGIONS — 1002

GENERATING OUTER AND INNER CONTOURS OF THE SUBJECT INTO BINARY DEPTH MATTES — 1003

OPTIONALLY SMOOTHING THE INNER AND OUTER CONTOURS — 1004

COMBINING THE OUTER AND INNER CONTOURS TO GENERATE A COARSE MATTE — 1005

GENERATING A REFINED MATTE (e.g., AN RGB-D MATTE) USING THE COARSE DEPTH MATTE, THE IMAGE DATA AND THE DEPTH DATA — 1006

REMOVING UNDEFINED REGIONS AND ARTIFACTS FROM THE REFINED MATTE — 1007

FIG. 10

AUGMENTED REALITY SELF-PORTRAITS

CROSS-REFERENCE TO RELATED APPLICATION

This application is a division of and claims priority to U.S. patent application Ser. No. 16/124,168, filed Sep. 6, 2018, which claims priority to U.S. Provisional Patent Application No. 62/556,297, entitled "Augmented Reality Self-Portraits," filed on Sep. 8, 2017, the entire contents of each of which are incorporated herein by reference.

TECHNICAL FIELD

This disclosure relates generally to media editing and augmented reality.

BACKGROUND

Self-portrait digital photos or "selfies" have become a pop-culture phenomenon. Selfies are typically taken with a digital camera or smart phone held at arm's length, pointed at a mirror or attached to a selfie stick to position the camera farther away from the subject and capture the background scene behind the subject. Selfies are often shared on social networking services (e.g., Facebook®, Instagram®, Twitter®). Augmented reality (AR) is a live view of a physical, real-world environment whose elements are "augmented" by computer-generated sensory input such as sound, video or graphics.

SUMMARY

Systems, methods, apparatuses and non-transitory, computer-readable storage mediums are disclosed for generating AR self-portraits or "AR selfies."

In an embodiment, a method comprises: capturing, by a first camera of a mobile device, live image data, the live image data including an image of a subject in a physical, real-world environment; receiving, by a depth sensor of the mobile device, depth data indicating a distance of the subject from the camera in the physical, real-world environment; receiving, by one or more motion sensors of the mobile device, motion data indicating at least an orientation of the first camera in the physical, real-world environment; generating, by one or more processors of the mobile device, a virtual camera transform based on the motion data, the camera transform for determining an orientation of a virtual camera in a virtual environment; receiving, by the one or more processors, content from the virtual environment; generating, by the one or more processors, a matte from the image data and the depth data; generating, by the one or more processors, a composite image data, using the image data, the matte and first virtual background content, the first virtual background content selected from the virtual environment using the camera transform; and causing display, by the one or more processors, the composite image data on a display of the mobile device.

In an embodiment, a method comprises: presenting a preview on a display of a mobile device, the preview including sequential frames of preview image data captured by a forward-facing camera of a mobile device positioned in close range of a subject, the sequential frames of preview image data including close range image data of the subject and image data of a background behind the subject in a physical, real world environment; receiving a first user input to apply a virtual environment effect; capturing, by a depth sensor of the mobile device, depth data indicating a distance of the subject from the forward-facing camera in the physical, real-world environment; capturing, by one or more sensors of the mobile device, orientation data indicating at least an orientation of the forward-facing camera in the physical, real-world environment; generating, by one or more processors of the mobile device, a camera transform based on the motion data, the camera transform describing an orientation of a virtual camera in a virtual environment; obtaining, by the one or more processors and using the camera transform, a virtual background content from the virtual environment; generating, by the one or more processors, a matte from the sequential frames of image data and the depth data; generating, by the one or more processors, composite sequential frames of image data, including the sequential frames of image data, the matte and the virtual background content; and causing display, by the one or more processors, of the composite sequential frames of image data.

Other embodiments are directed to systems, method, apparatuses and non-transitory, computer-readable mediums.

Particular implementations disclosed herein provide one or more of the following advantages. The user experience of creating a selfie on a mobile device is improved by allowing the user to capture and record a selfie video using a forward-facing or reverse-facing camera embedded in the mobile device, and automatically replace the real-world background captured in a live video preview user-selected virtual background content that automatically updates in response to motion data from motion sensors of the mobile device. The disclosed implementations therefore provide an interactive and entertaining process for capturing selfie images that can be shared with friends and family through social networks.

The details of the disclosed implementations are set forth in the accompanying drawings and the description below. Other features, objects and advantages are apparent from the description, drawings and claims.

DESCRIPTION OF DRAWINGS

FIG. 9 is a flow diagram of a process for generating an AR selfie, according to an embodiment.

FIG. 10 is a flow diagram of a process for generating an AR selfie matte, according to an embodiment.

The same reference symbol used in various drawings indicates like elements.

DETAILED DESCRIPTION

Figure 1:
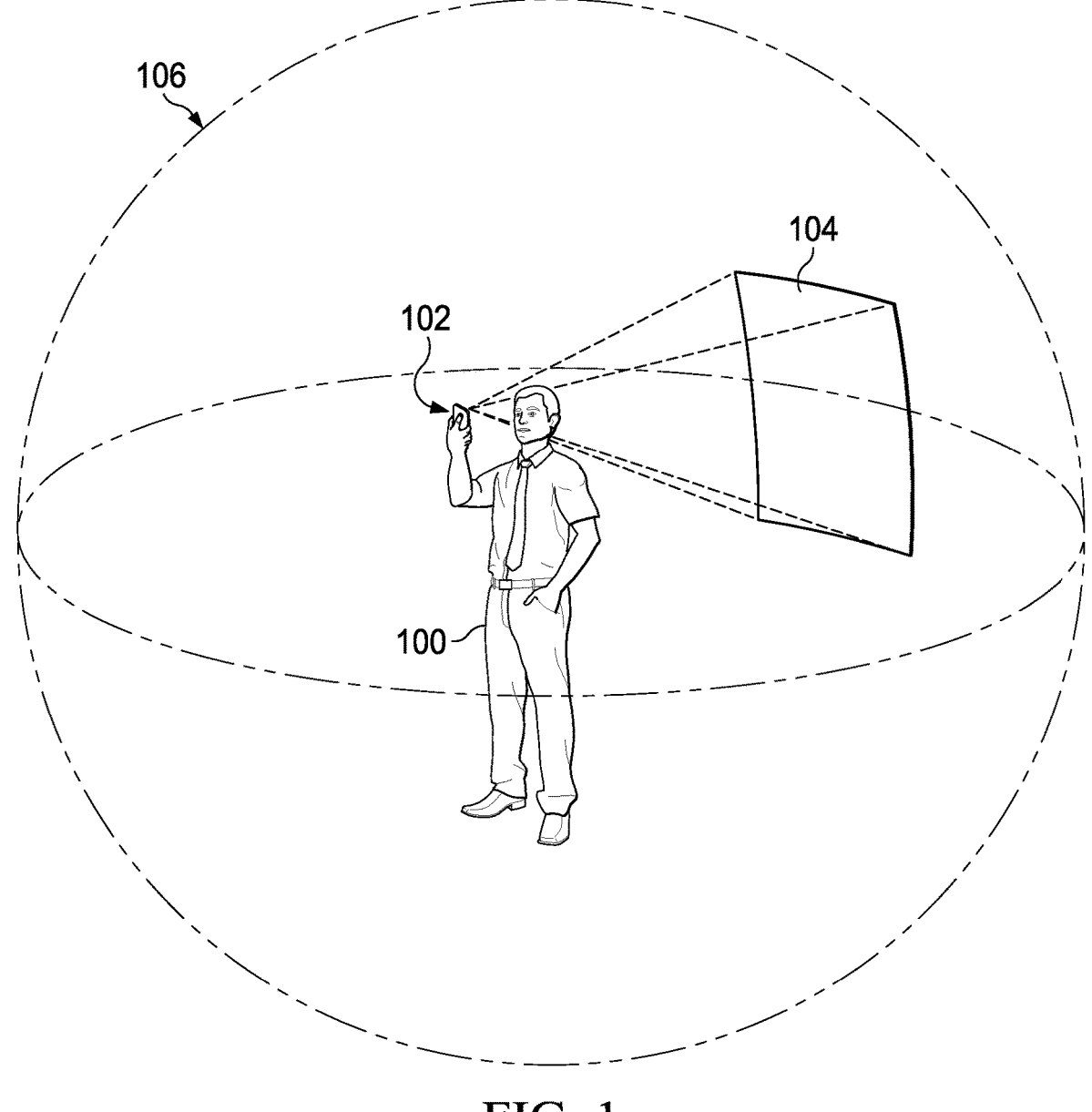
FIG. 1 is a conceptual drawing illustrating the basic concept of an AR selfie, according to an embodiment.

A "selfie" is a self-portrait image taken by a user, often in close proximity by holding a camera within arms-length or using an extension device, such as a "selfie" stick. The selfie subject is often of the user's face, or a portion of the user (e.g., the user's upper body) and any background visible behind the user. A forward-facing camera is a camera that is facing the user as they are viewing the display screen. Alternatively, a backward-facing camera is facing away from the user as they are viewing the display screen, and captures images of the real-world environment in front of, and in the opposite direction, of the user. A typical mobile device for capturing selfies is a digital camera, a smart phone with one or more embedded digital cameras or a tablet computer with one or more embedded cameras.

In an embodiment, a selfie subject can be composited with virtual background content extracted from a virtual environment data model. The virtual background content can include but is not limited to: a two-dimensional (2D) image, a three-dimensional (3D) image and 360° video. In a pre-processing stage, a coarse matte is generated from depth data provided by a depth sensor and then refined using video data (e.g., RGB video data). In an embodiment, the depth sensor is an infrared (IR) depth sensor embedded in the mobile device. The matte is composited (e.g., using alpha compositing) with the video data containing an image of the selfie subject, and the real-world background behind the subject is replaced and continuously updated with virtual background content selected from a virtual environment selected by the user. The virtual background content is selected using a virtual camera transform generated using motion data from one or more motion sensors of the mobile device (e.g., accelerometers, gyroscopes). The video data, refined matte, virtual background content and optionally one or more animation layers are composited to form an AR selfie video. The AR selfie video is displayed to the user by a viewport of the mobile device.

In an embodiment, the mobile device also includes a backward-facing camera that can be used to capture video in front of the user, and which can be processed in a similar manner as video captured the forward-facing camera. A camera flip signal provided by the operating system of the mobile device can indicate, which camera is capturing video, and that signal can be used to adjust the virtual camera transform to update the virtual background content.

A matte generation process is disclosed that uses undefined depth data (also referred to herein as "shadow data") to segment a depth image (e.g., binary depth matte) into foreground and background regions. The matte contains coverage information that includes a contour of the subject being drawn, making it possible to distinguish between parts of the binary depth matte where the subject was actually drawn and other parts of the binary depth matte that are empty. In an embodiment, the matte generation process uses a region-growing algorithm and/or a 3D face mesh to identify and fill "holes" (undefined depth data) in the matte caused by sunlight reflecting off sunglasses worn by the subject.

Although the matte generation process is disclosed herein as part of an AR selfie generation process, the disclosed matte generation process can be used to generate mattes from depth data for any image processing application. For example, the disclosed matte generation process can be used to segment images as a part of a video/image editing tool.

In an embodiment, the virtual environment can be any desired environment, such as a famous city (e.g., London, Paris or New York), and include famous landmarks (e.g., Big Ben, London Bridge, Eifel Tower). The virtual environment can also be completely fictional, such as a cartoon environment complete with cartoon characters, flying saucers and any other desired props. In an embodiment, motion effects (e.g., blurring effects, glowing effects, cartoon effects) can be applied to one or more of the video data, the virtual background content and the matte. Motion effects can also be applied to the final composite video. In an embodiment, one or more animation layers (e.g., a layer of animated particles resembling snow falling or sparks) can be composited with the video data, the matte and the virtual background content.

In an embodiment, a selfie GUI includes various controls, such as a control for recording an AR selfie video to a storage device (e.g., flash memory of the mobile device), a control for turning one or more microphones of the mobile device on and off, a camera reversal button for switching between forward-facing and backward-facing cameras and a tray for storing thumbnail images of AR selfie videos that can be selected to retrieve and playback the corresponding video on the mobile device.

Overview of AR Selfie Concept

FIG. 1 is a conceptual drawing illustrating the concept of an AR selfie, according to an embodiment. User 100 is shown taking a selfie using a forward-facing camera of mobile device 102. During recording, a viewport on mobile device 102 displays a live video feed of user 100 in the foreground with virtual background content 104 extracted from virtual environment 106. When user 100 changes the orientation of mobile device 102 in the real-world (e.g., rotates the view direction of the camera), motion sensors (e.g., accelerometers, gyros) of mobile device 102 sense the change and generate motion data that is used to update virtual background content 104 with new virtual background content extracted from a different portion of virtual environment 106, as described further in reference to FIGS. 2A-2E. The portion extracted from virtual background content 104 depends on how user 100 is holding mobile device 102. For example, if user 100 is holding mobile device 102 in "portrait" orientation when taking a selfie, then the portion extracted from virtual background content 104 will have an aspect ratio that will fill the viewport in a portrait or vertical orientation. Similarly, if user 100 is holding mobile device 102 in "landscape" orientation when taking a selfie, then the portion extracted from virtual background content 104 will have an aspect ratio that will fill the viewport in a landscape or horizontal orientation.

Example Mapping of a Virtual Environment

Figure 2A:
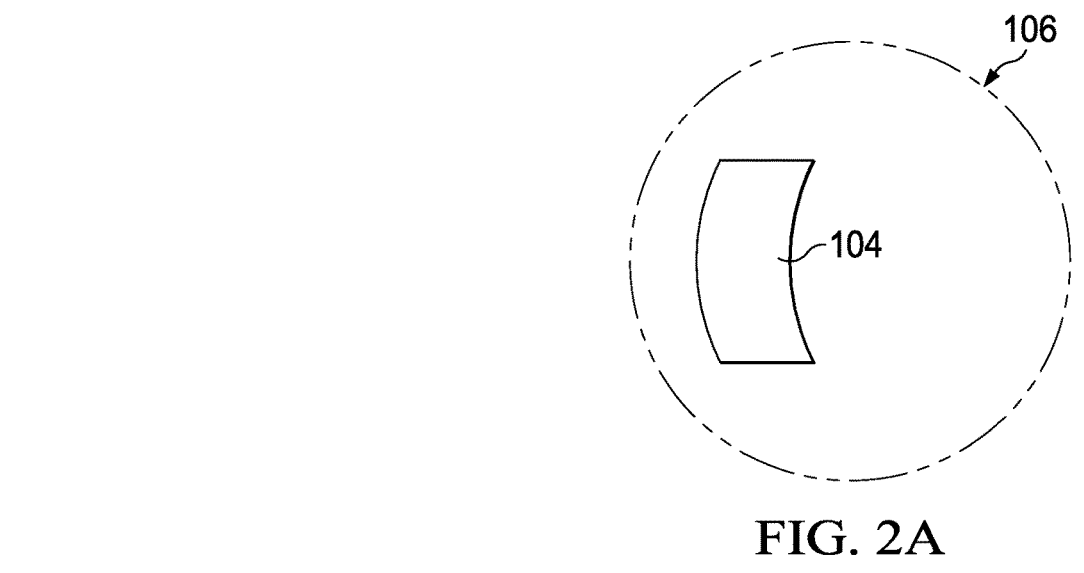
FIGS. 2A-2E illustrate mapping of a virtual environment to a mobile device viewport, according to an embodiment.
Figure 2B:
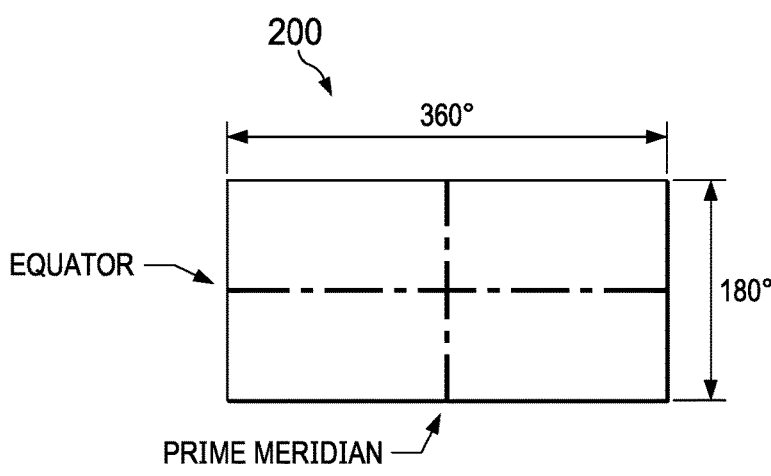

FIGS. 2A-2E illustrate mapping of a virtual environment to a viewport of a mobile device, according to an embodiment. FIG. 2A shows unit sphere 106 with corners of viewport 202 (FIG. 2C) projected onto its surface. FIG. 2B shows an equirectangular projection 200 (e.g., a Mercator projection) that is generated by mapping the projected viewport 202 from a spherical coordinate system to a planar coordinate system. In an embodiment, the horizontal line dividing equirectangular projection 200 is the equator of unit sphere 106 and the vertical line dividing equirectangular projection 200 is the prime meridian of unit sphere 106. The width of equirectangular projection 200 spans from 0° to 360° and the height spans 180°.

Figure 2C:
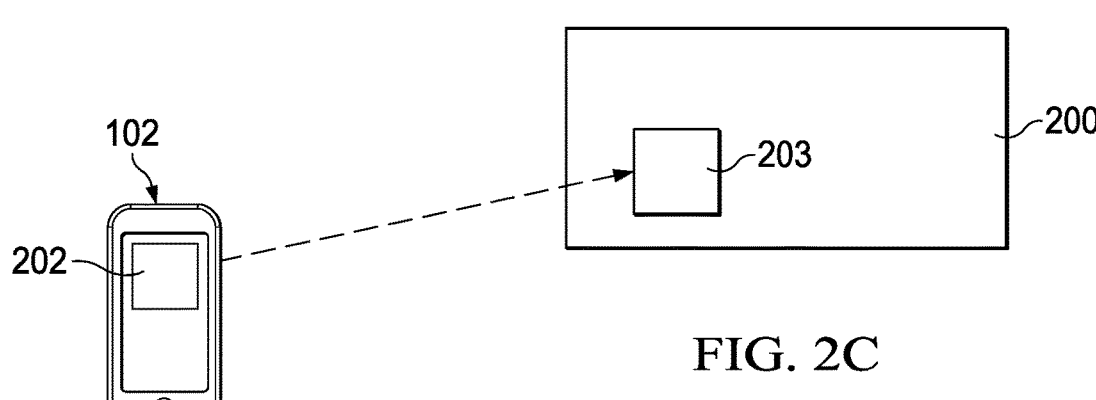

FIG. 2C shows subrectangle 203 overlying equirectangular projection 200. Subrectangle 203 represents viewport 202 of mobile device 102 in planar coordinates. Equirectangular projection 200 can be sampled into viewport 202 using Equations [1] and [2] with reference to FIG. 2E:

$$\phi = a\tan\left(\frac{y_c}{x_c}\right), \text{latitude} \qquad [1]$$

$$\lambda = a\,\cos(z_c), \text{longitude}. \qquad [2]$$

Figure 2D:
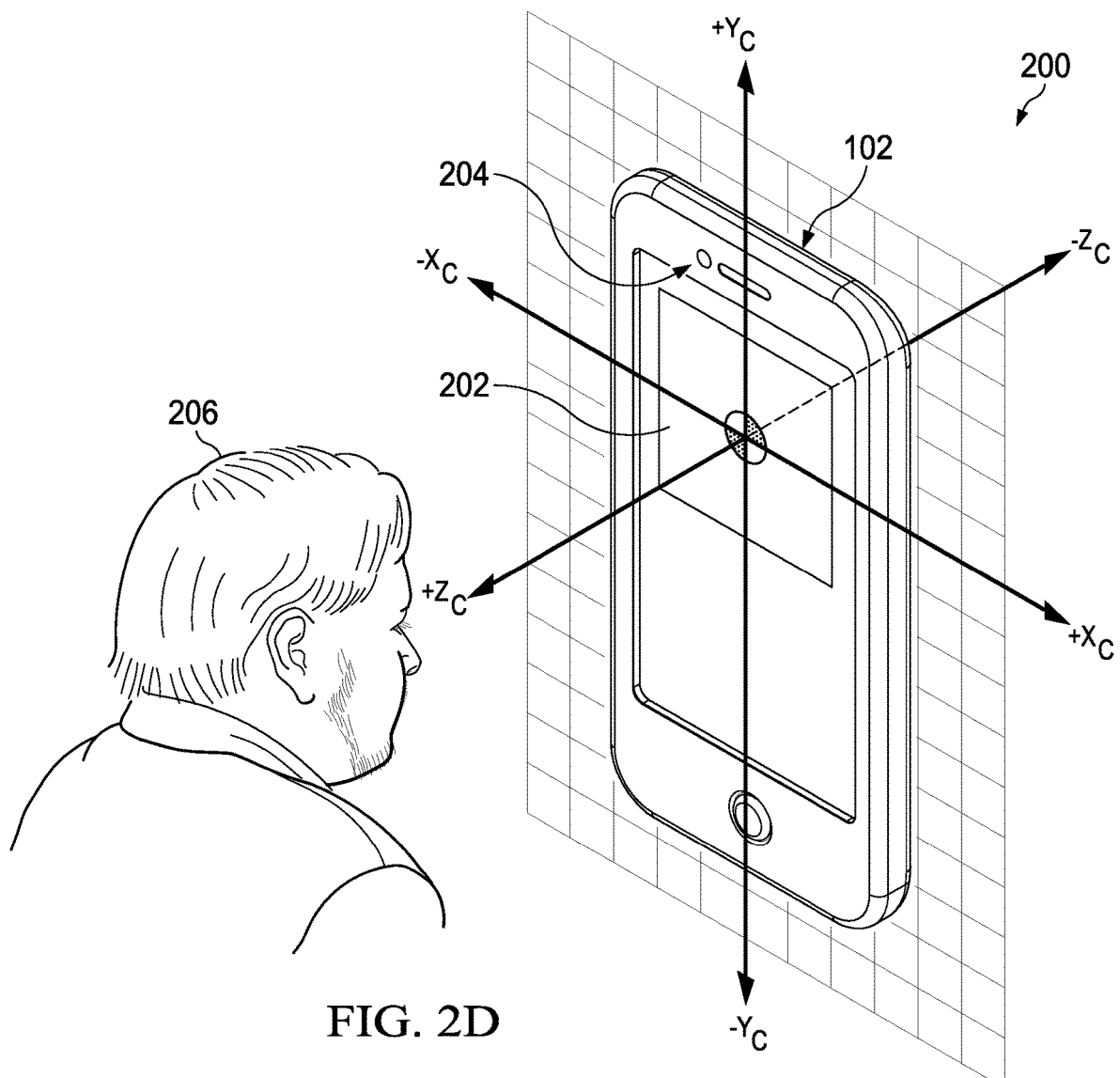
Figure 2E:
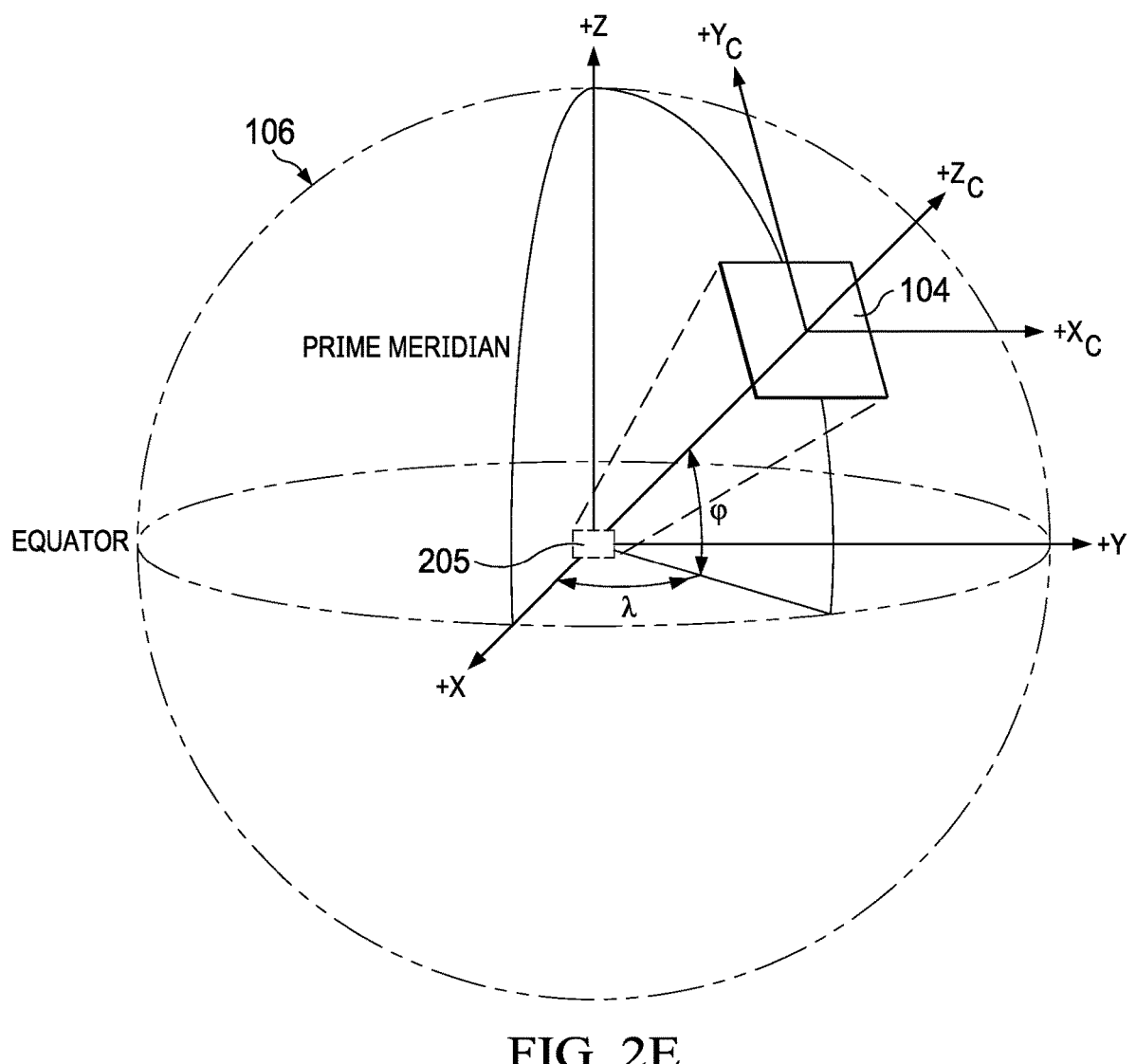

FIG. 2D illustrates mobile device 102 with viewport 202 and forward-facing camera 204. A viewing coordinate system $(X_c, Y_c, Z_c)$ is shown where the $+Z_c$ coordinate is the forward-facing camera's view direction. In computer graphics, a camera analogy is used where viewer 206 located at a view reference point (VRP) observes a virtual environment through virtual camera 205 and can look and move around the virtual environment. This is accomplished by defining a viewing coordinate system (VCS) which has the position and orientation of virtual camera 205, as shown in FIGS. 2D and 2E. In FIG. 2E, virtual camera 205 is shown as fixed position to the origin and has a latitude (φ) and longitude (λ) in a virtual world coordinate system. One can imagine virtual camera 205 looking out at unit sphere 106 with an image of the virtual backward-facing camera in the −Z direction as shown in FIG. 2D. For forward-facing camera 204, virtual camera 205 is rotated by 180° (about the Y axis in FIG. 2D) to generate a forward-facing camera view in the +Z direction, which shows the virtual background "over the shoulder" of viewer 206.

In an embodiment, an attitude quaternion generated by an attitude processor of mobile device 102 can be used to determine the view direction of the backward-facing and forward-facing cameras. When viewer 206 rotates mobile device 102, the motion sensors (e.g., gyroscopes) sense the rotation or rotation rate and update the attitude quaternion of mobile device 102. The updated attitude quaternion (e.g., a delta quaternion) can be used to derive a camera transform for determining the camera view direction in the virtual environment for a backward-facing camera, or can be further transformed by 180° for determining the camera view direction in the virtual environment for a forward-facing camera.

The mathematics for deriving the camera transform are well-known in computer graphics and will not be discussed further herein. An important feature of the disclosed embodiments, however, is that the real-world orientation of the real-world cameras are used to drive the orientation of the virtual camera in the virtual environment, the result being that as the view direction of the real-world camera changes in real-time, the virtual camera view direction (represented by the camera transform) also changes in sync with the real-world camera. As will be described below, this technique creates the illusion that the user is taking a selfie in virtual environment 106 (FIG. 1), and therefore capturing the virtual background behind the user rather than the real-world background. In an embodiment, when a user first enters the scene the device orientation (e.g., azimuth, elevation) can be biased towards a portion of the scene that is visually impressive (referred to as a "hero angle"). For example, a delta can be applied to the device orientation when the user looks around the scene, with the delta calculated as the difference between the hero angle and the device orientation when the user enters the scene.

Example GUIs for Recording AR Selfies

Figure 3A:
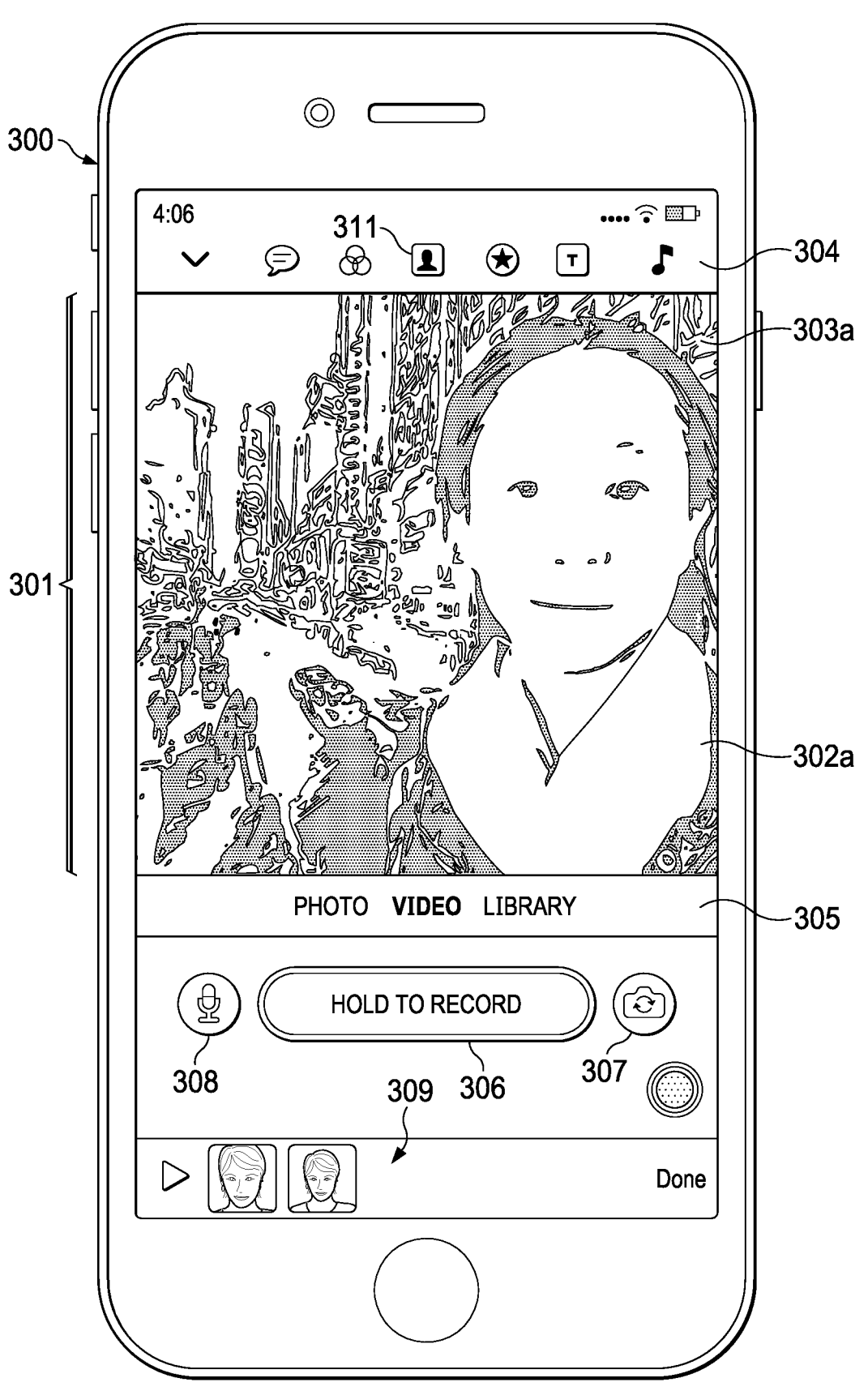
FIGS. 3A and 3B illustrate a graphical user interface for recording AR selfies using a forward-facing camera, according to an embodiment.
Figure 3B:
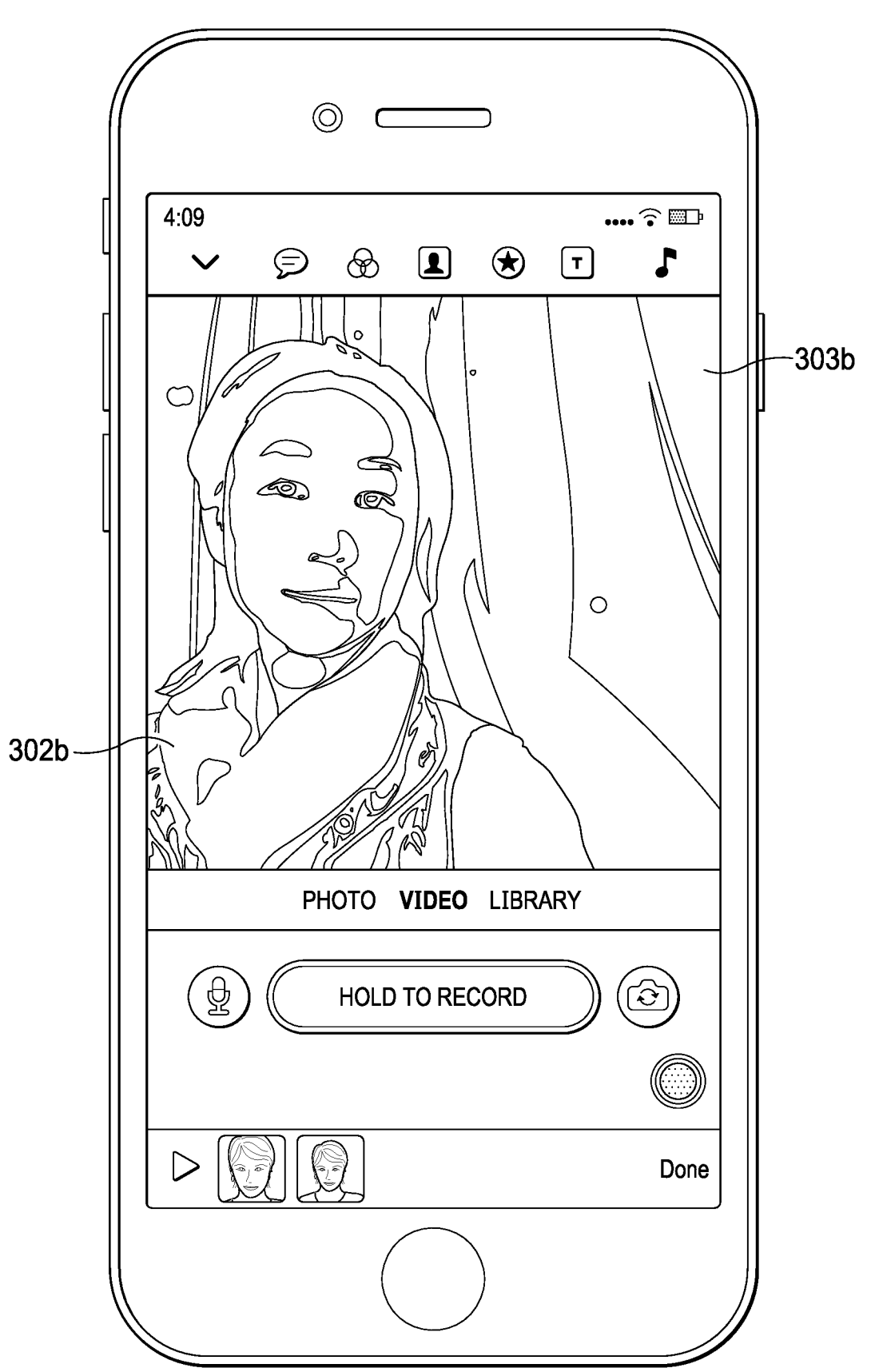

FIGS. 3A and 3B are graphical user interfaces for recording AR selfies, according to an embodiment. Referring to FIG. 3A, AR selfie GUI 300 includes viewport 301 displaying a composite video frame that includes selfie subject 302a and virtual background content 303a. A "cartoon" special effect has been applied to the composite video to create an interesting effect and to hide artifacts from the alpha compositing process. Although a single composite video frame is shown, it should be understood that viewport 301 is displaying a live video feed (e.g., 30 frames/second), and if the orientation of the real-world camera view direction changes, virtual background 303a will also seamlessly change to show a different portion of the virtual environment. This allows the user to "look around" the visual environment by changing the view direction of the real-world camera.

In an embodiment, the location of the virtual camera, in addition to its orientation, can be changed in the virtual environment. For example, the location of the virtual camera can be changed by physically moving the mobile device or by using an GUI affordance (a virtual navigation button). In the former, location data (e.g., GNSS data) and/or inertial sensor data (e.g., accelerometer data) can be used to determine the position of the virtual camera in the virtual environment. In an embodiment, the virtual environment can be 3D video, 3D 360° video or 3D computer-generated imagery (CGI) that can respond to a user's actions.

GUI 300 also includes several affordances for performing various tasks. Tab bar 304 allows the user to select a photo editing option, such as invoking AR selfie recording. Tab bar 305 allows the user to select a camera function (e.g., photo, video, panorama, library). Tab bar 304 can be context sensitive such that the options in tab bar 304 can change based on the camera function that is selected in tab bar 305. In the example shown, the "video" option is selected in tab bar 305 and the AR selfie recording option 311 is selected in tab bar 304.

To record the AR selfie, GUI 300 includes virtual record button 306 for recording the AR selfie to local storage (e.g., flash memory). Thumbnail image tray 309 can hold thumbnail images for recorded AR selfies, which can be selected to playback the corresponding AR selfie video in viewport 301. Camera reversal button 307 allows the user to toggle between forward-facing and backward-facing cameras. Microphone enable button 308 toggles one or more microphones of mobile device 102 on and off. A done button 310 exits GUI 300.

FIG. 3B shows a different special effect applied to selfie subject 302b and a different virtual background content 303b. For example, virtual background content can be a cartoon environment with animated cartoon characters and other objects. It should be understood that any virtual background content can be used in an AR selfie. In some implementations, animated objects (e.g., animated particles such as snowflakes and sparks) can be inserted between the selfie subject and the virtual background content to create a more beautiful virtual environment, as described in reference to FIG. 5. In an embodiment, selfie subject 302b can be given an edge treatment, such as a "glow" or outline around the image or an "ink" outline. In an embodiment, animated objects can be inserted in front of selfie subjects 302a, 302b.

For example, selfie subjects 302a, 302b can be surrounded by a floating text ribbon or other animated object. In an embodiment, selfie subjects 302a, 302b can be layered over an existing real-world photo or video.

Figure 3C:
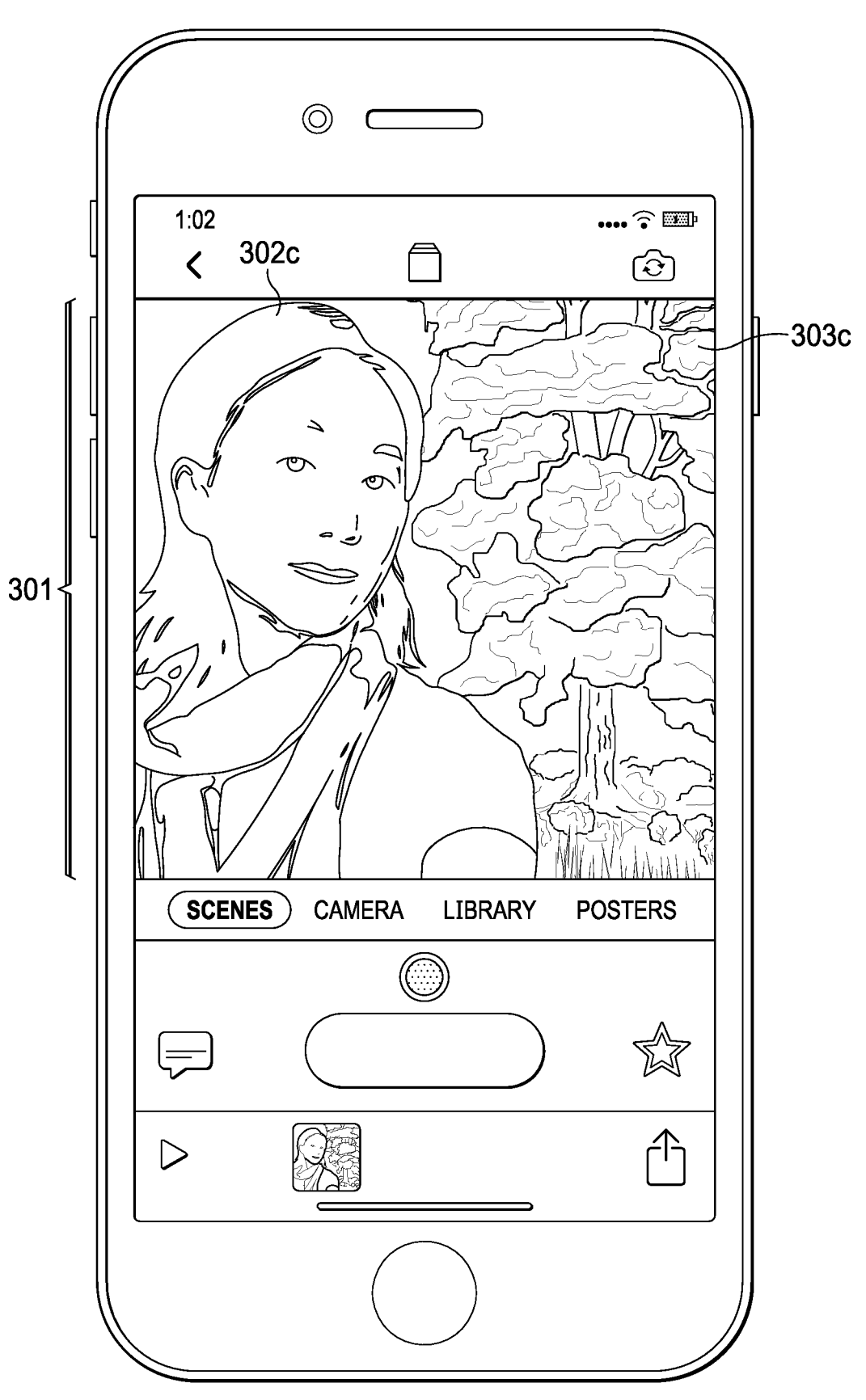
FIGS. 3C and 3D illustrate graphical user interfaces with different background scenes selected and showing a recording view and full-screen playback view, according to an embodiment.
Figure 3D:
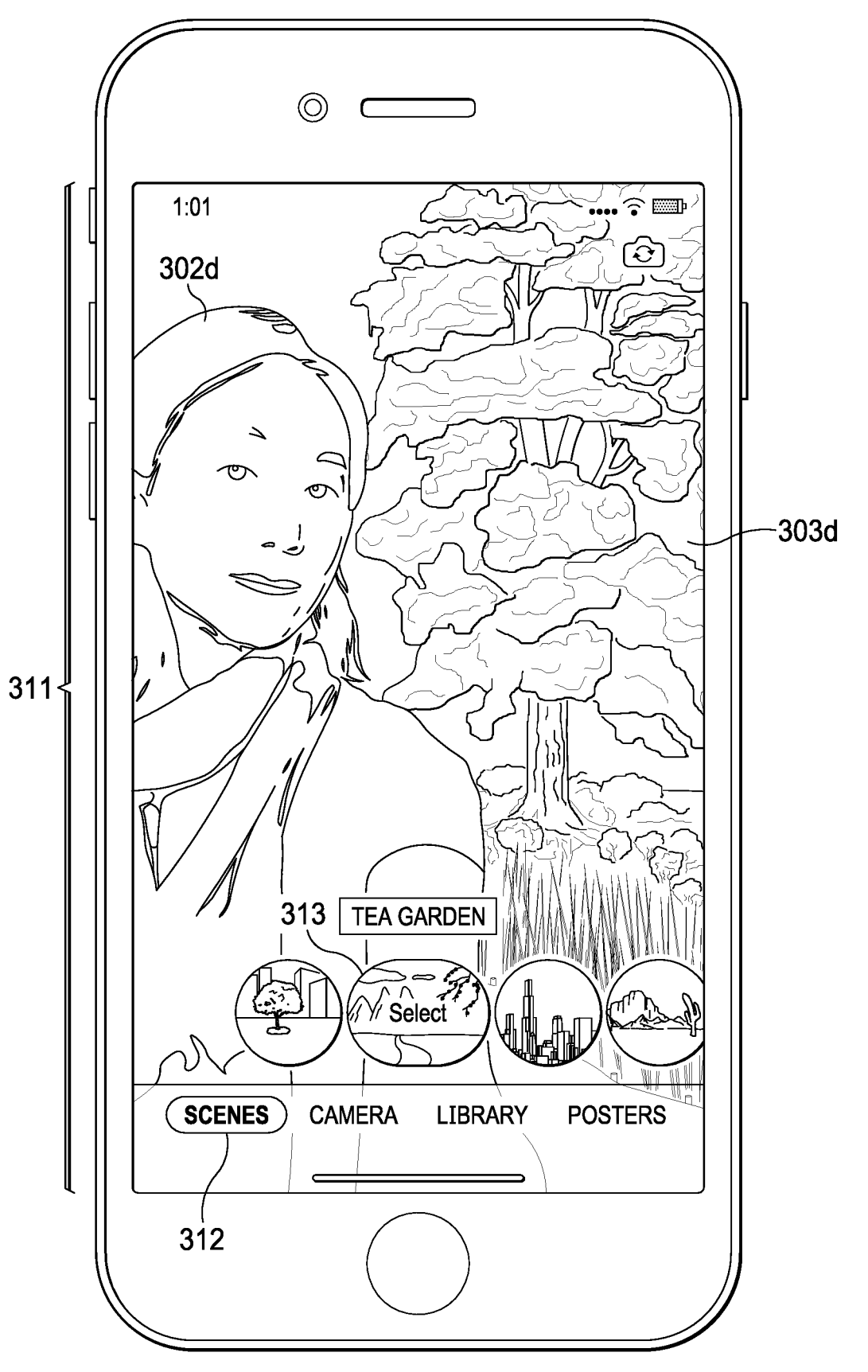

FIGS. 3C and 3D illustrate graphical user interfaces with different background scenes selected and showing a recording view and full-screen playback view, according to an embodiment. In FIG. 3C, a recording view is shown where user 302c has selected a virtual background 303c. Note that during recording, viewport 301 is not full-screen to provide room for recording controls. In FIG. 3D, a full-screen playback view includes scene selector 313 that can be displayed when user 302d has selected the "SCENES" affordance 312. In an embodiment, scene selector 313 is a touch control that can be swiped by user 302d to select virtual background 303d, which in this example is a Japanese tea garden. Also note that virtual background 303d is now displayed full-screen in viewport 311.

Figure 3E:
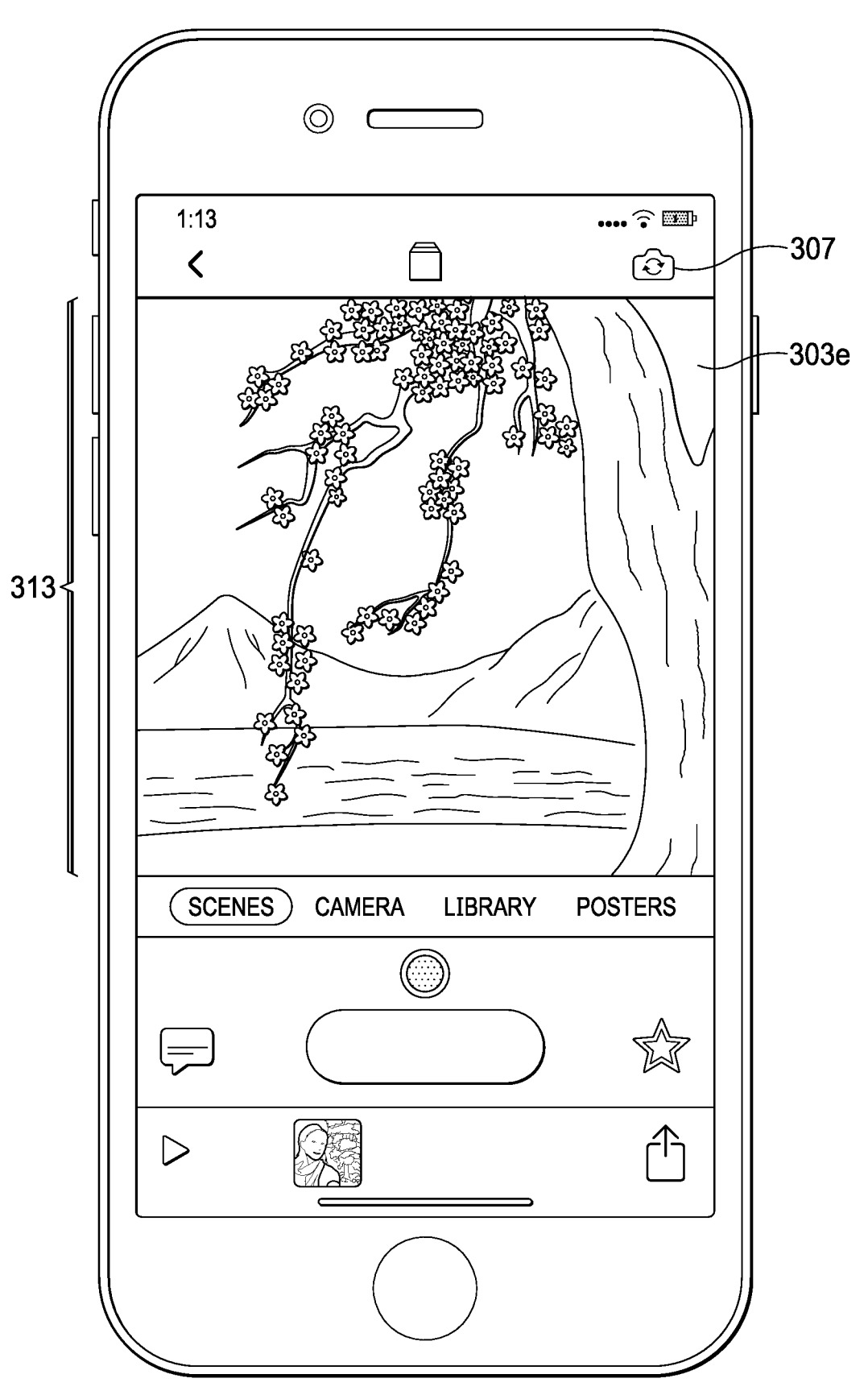
FIGS. 3E and 3F illustrate graphical user interfaces for recording and playing back selfies using a backward-facing camera and showing a recording view and full-screen playback view, according to an embodiment.
Figure 3F:
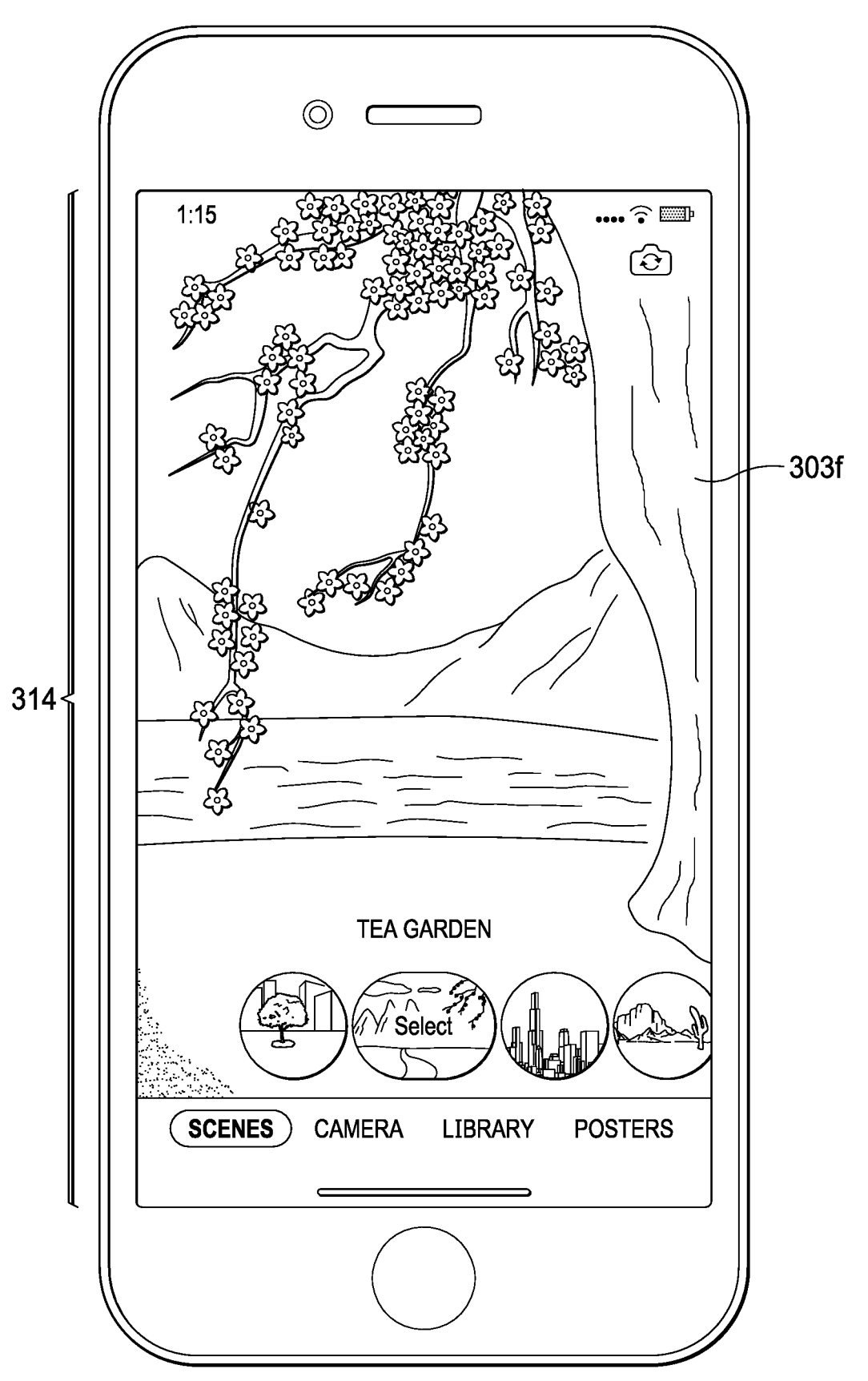

FIGS. 3E and 3F illustrate graphical user interfaces for recording and playing back selfies using a backward-facing camera and showing a recording view and full-screen playback view, according to an embodiment. In FIG. 3E, a recording view is shown with virtual background 303e. Virtual background 303e is what a user would see in front of them through the backward-facing camera in the virtual environment. Affordance 307 can be selected by the user to toggle between forward-facing and backward-facing cameras. In FIG. 3F, a full-screen playback view includes scene selector 313 that can be displaced when user 302d has selected the "SCENES" affordance 312. In an embodiment, scene selector 313 can be swiped by user 302d to select virtual background 303f, which in this example is a Japanese tea garden. Also note that virtual background 303f is now displayed full-screen in viewport 314. In an embodiment, when the user first selects a virtual environment a pre-defined orientation is presented in the viewport.

Example System for Generating AR Selfies

Figure 4:
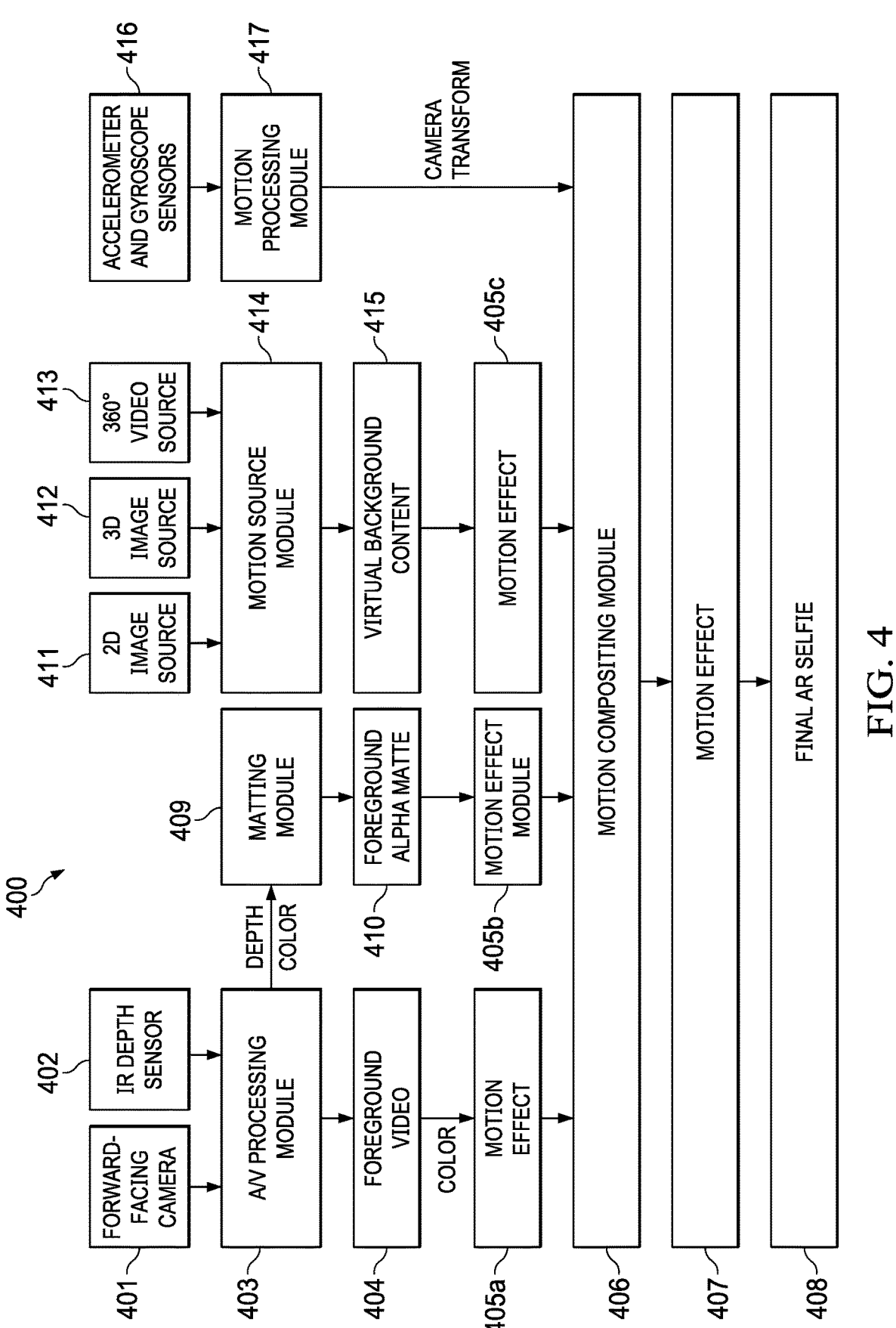
FIG. 4 is a block a diagram of a system illustrating the process steps used in the creation of an AR selfie, according to an embodiment.

FIG. 4 is a block a diagram of system 400 illustrating the processing steps used in the creation of an AR selfie, according to an embodiment. System 400 can be implemented in software and hardware. Forward-facing camera 401 generates RGB video and IR depth sensor 402 generates depth data, which are received by Audio/Visual (A/V) processing module 403. A/V processing module 403 includes software data types and interfaces to efficiently manage queues of video and depth data for distribution to other processes, such as matting module 409, which performs the processes described in reference to FIGS. 6A-6L. A/V processing module 403 also provides foreground video 404 including images of the selfie subject, which can be optionally processed with a motion effect 405a, such as the "cartoon" effect shown in FIG. 3A. Matting module 409 outputs a foreground alpha matte 410, which can be optionally processed by motion effect module 405b.

For virtual background processing, one or more of 2D image source 411, 3D image source 412 or 360° video source 413 can be used to generate virtual background content 415. In an embodiment, a 3D image source can be a rendered 3D image scene with 3D characters. These media sources can each be processed by motion source module 412, which selects the appropriate source depending the virtual environment selected by the user. Motion compositing module 406 generates composite video from foreground video 404, foreground alpha matte 410 and virtual background content 415, as described in reference to FIG. 5. Motion effect 407 (e.g., a blurring effect) can be optionally applied to the composite video output by motion compositing module 406 to generate the final AR selfie 408.

Accelerometer and gyroscope sensors 416 provide motion data that is processed by motion processing module 417 to generate a camera transform, as described in reference to FIGS. 2A-2E. During recording, live motion data from the sensors 416 is used to generate the AR selfie and is stored in a local storage device (e.g., stored in flash memory). When the AR selfie is played back, the motion data is retrieved from the local storage device. In an embodiment, in addition to virtual camera orientation, virtual camera position in the virtual environment can be provided by motion processing module 417 based on sensor data. With virtual camera and position information, the user can walk around the 3D scene with 3D characters.

Example Compositing Process

Figure 5:
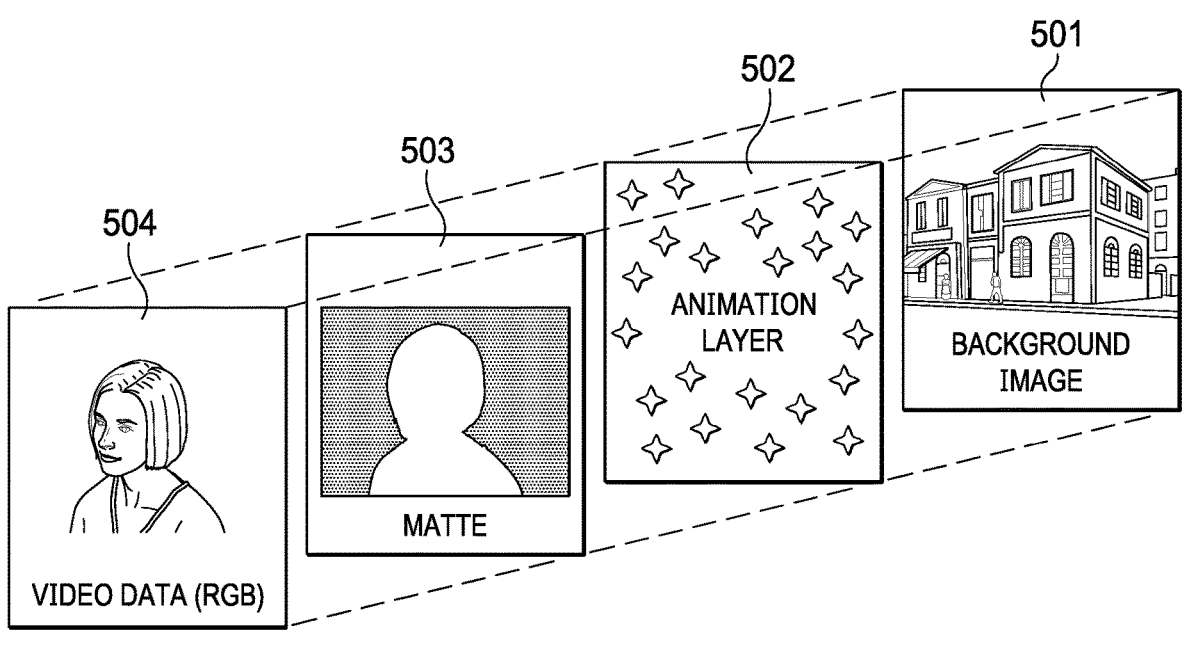
FIG. 5 illustrates compositing layers used in an AR selfie, according to an embodiment.

FIG. 5 illustrates compositing layers used in an AR selfie, according to an embodiment. In an embodiment, alpha compositing is used to combine/blend the video data containing an image of the selfie subject with the virtual background content. An RGB-Depth matte ("RGB-D matte") includes contour information for the subject projected on a binary depth matte, which is used to combine the foreground image of the subject with the virtual background content.

In the example shown, one or more animation layers 502 (only one layer is shown) is composited on background content 501. Matte 503 is composited on one or more animation layers 502 and foreground RGB video data 504, including the subject is composited on matte 503, resulting in the final composite AR selfie, which is then displayed through viewport 301 presented on a display of mobile device 102. In an embodiment, a motion effect can be applied to the composite video, such as a blurring effect to hide any artifacts resulting from the compositing process. In an embodiment, animation layers can be composited in front or back of the RGB video data 504.

Example Processes for Generating RGB-D Matte

In an embodiment, the depth sensor is an IR depth sensor. The IR depth sensor includes an IR projector and an IR camera, which can be an RGB video camera that operates in the IR spectrum. The IR projector projects a pattern of dots using IR light which falls on objects in the image scene, including the subject. The IR camera sends a video feed of a distorted dot pattern into a processor of the depth sensor and the processor calculates depth data from the displacement of the dots. On near objects the pattern of dots is dense and on far objects the pattern of dots are spread out. The depth sensor processor builds a depth image or map that can be read from by a processor of a mobile device. If the IR projector is offset from the IR camera, some of the depth data may be undefined. Typically, this undefined data is not used. In the disclosed matte generation process, however, the undefined data is used to improve segmentation and contour detection, resulting in a more seamless composite.

Figure 6A:
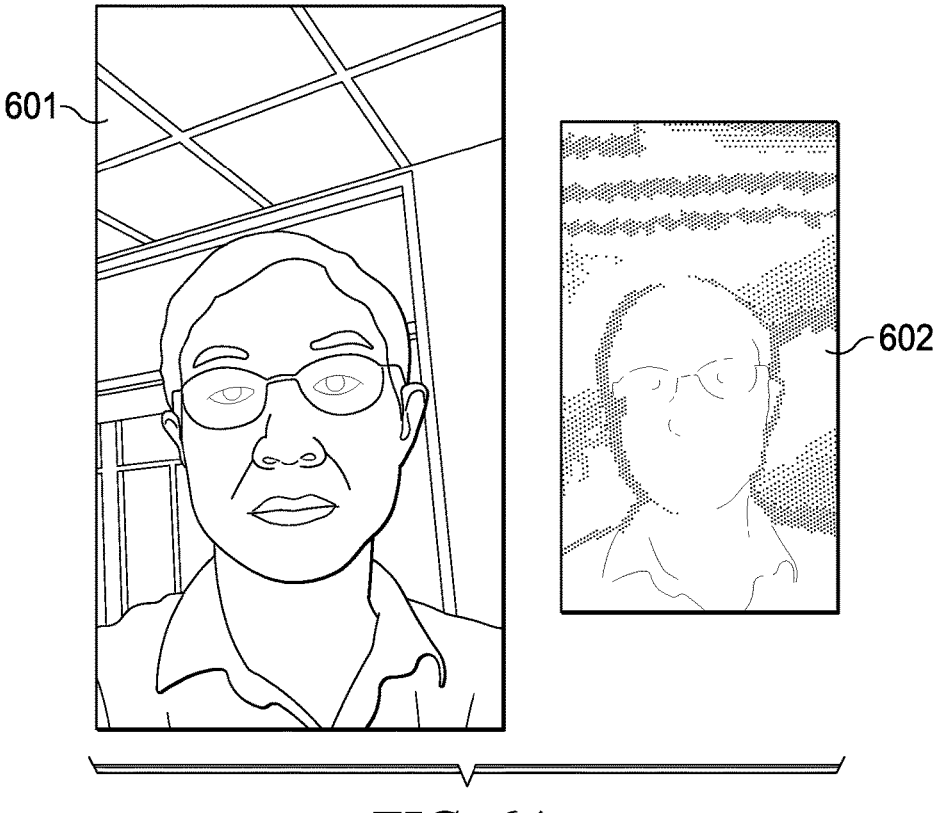
FIGS. 6A-6L illustrate a multi-stage process for generating a preprocessed (coarse) matte using depth data, according to an embodiment.
Figure 6B:
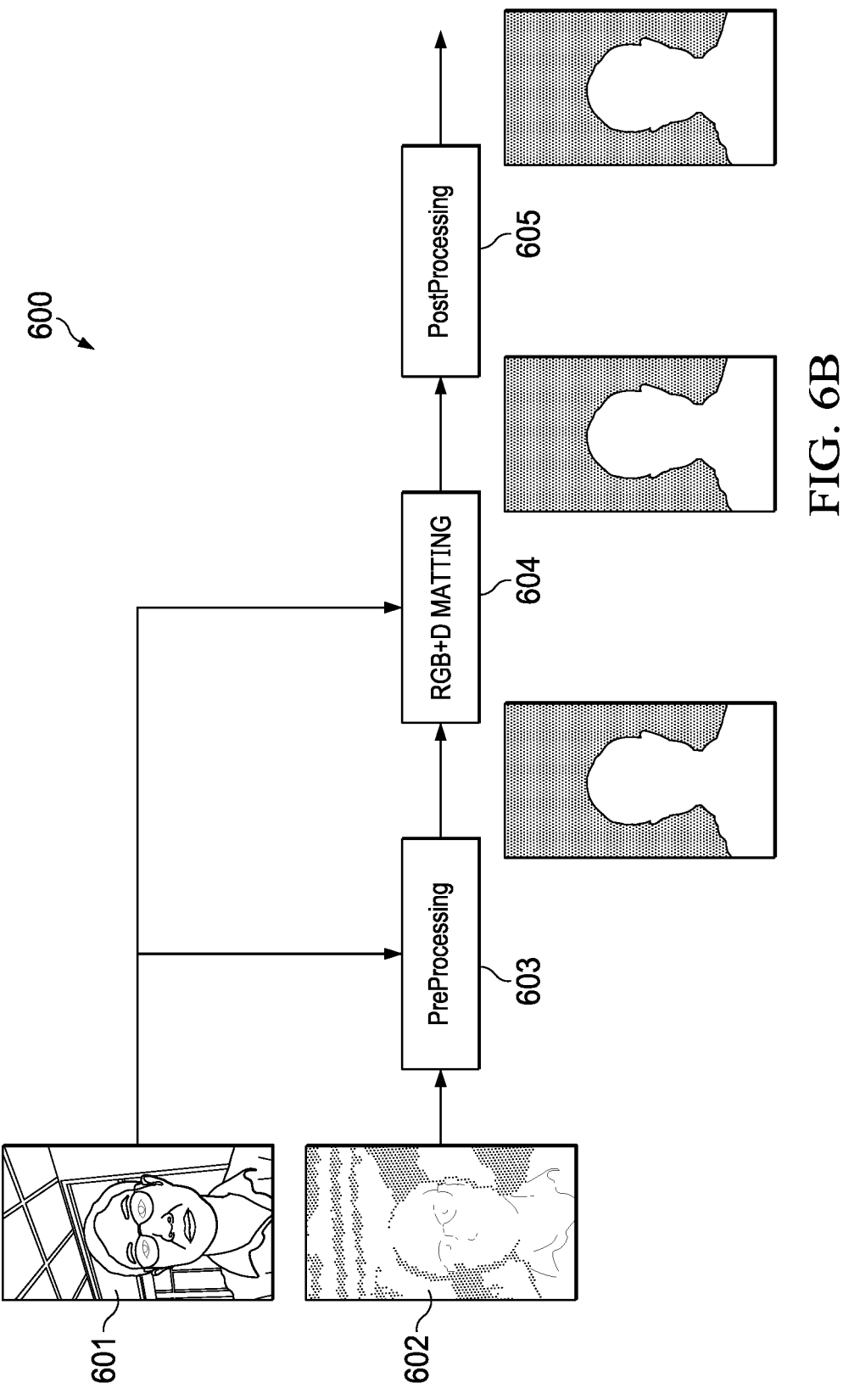

Referring to FIGS. 6A and 6B, matte generation process 600 can be divided into three stages: preprocessing stage 603, RGB-D matting stage 604 and post-processing stage 605. Process 600 takes as input RGB video data 601 that includes images of the subject and a depth map 602 that includes the depth data provided by the IR depth sensor. It should be observed that depth map 602 includes areas of shadow where the depth data is undefined. Note that the shadow along the left contour of the subject's face is thicker (more undefined data) than along the right contour of the subject's face. This is due to the offset between the IR projector and the IR camera. Each of stages 603-605 will be described in turn below.

Figure 6C:
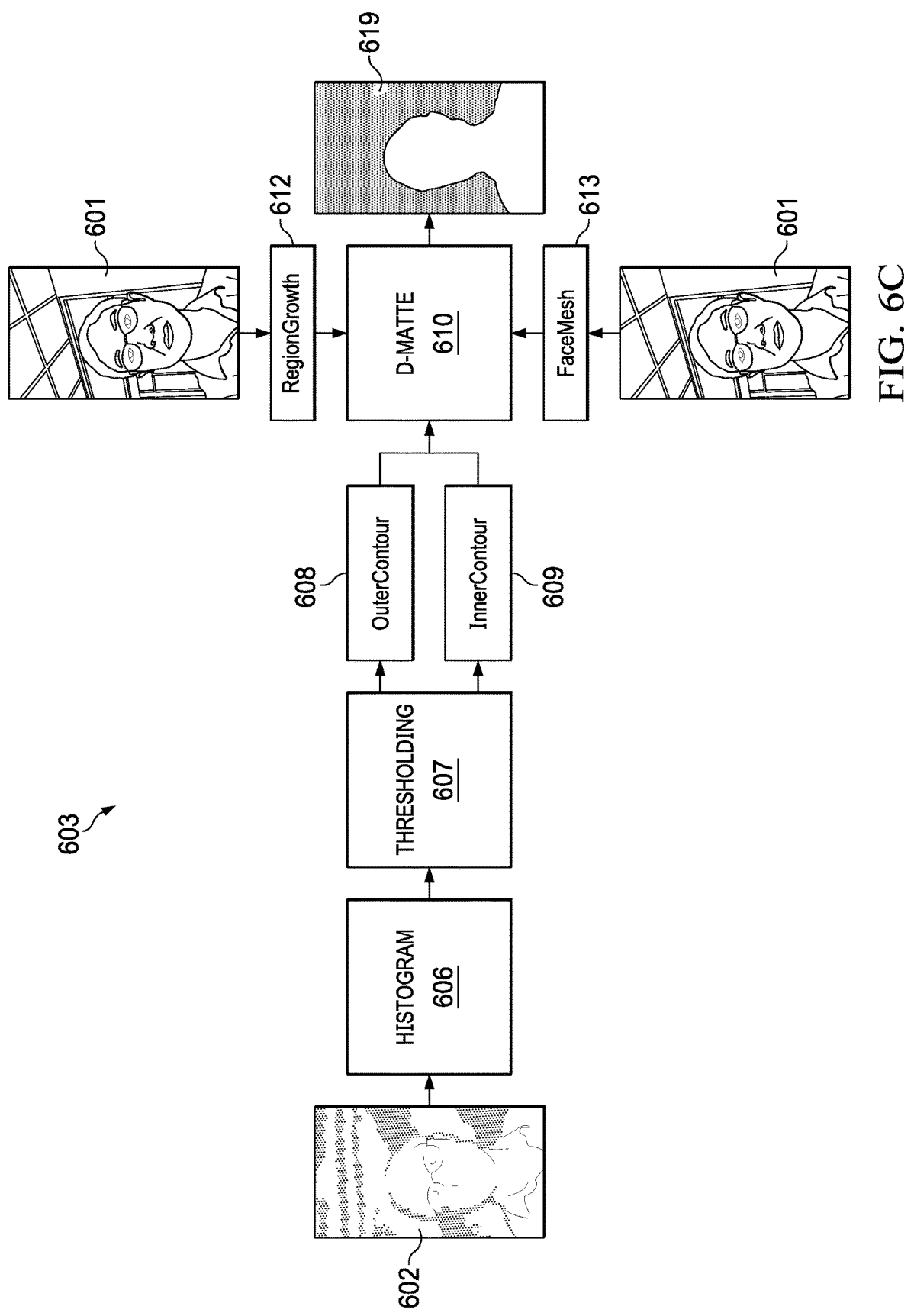

Referring to FIG. 6C, the steps of pre-processing stage 603 are shown, which include histogram generation 606, histogram thresholding 607, outer contour detection 608, inner contour detection 609 and coarse depth matte generation 610, iterative region growing 612 and a 3D face mesh modeling 613. Each of these preprocessing steps will now be described in turn.

Figure 6D:
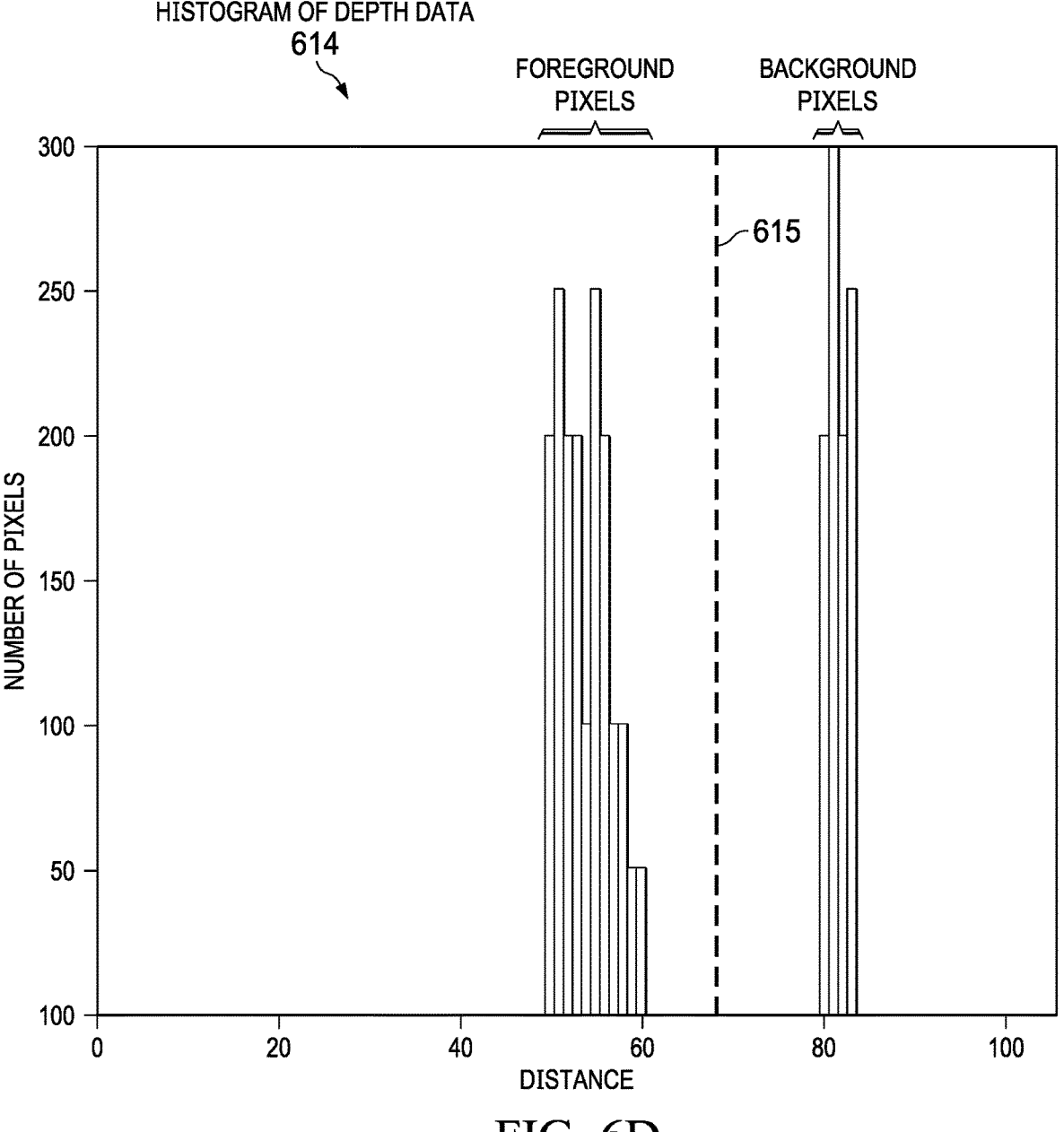

Histogram generation 606 places the depth data into bins. The histogram-thresholding step 607 is used to segment the foreground depth data from the background depth data by looking for "peaks and valleys" in the histogram. As shown in FIG. 6D, histogram 614 is generated from absolute distance data, where the vertical axis indicates the number of depth data values (hereinafter called "depth pixels") in each bin and the horizontal axis indicates the distance values provided by the depth sensor, which in this example is absolute distance. Note that in this example the distance values are in bin index multiples of 10.

It can be observed from FIG. 6D, that the foreground pixels cluster together in adjacent bins centered around 550 mm, and the background pixels cluster together in adjacent bins centered around 830 mm. Note that there could be additional clusters of distance data if an object was inserted in between the subject and the background or in front of the subject. A distance threshold can be established (shown as line 615) that can be used to segment the pixels into foreground and background pixels based on distance to create a binary depth matte. For example, each pixel that has a distance less than 700 mm is designated as foreground and assigned a binary value of 255 for white pixels in the binary depth matte (e.g., assuming an 8-bit matte), and each pixel that has a distance greater than 700 mm is designated as background and is assigned a binary value of 0 for black pixels in the binary depth matte.

Figure 6E:
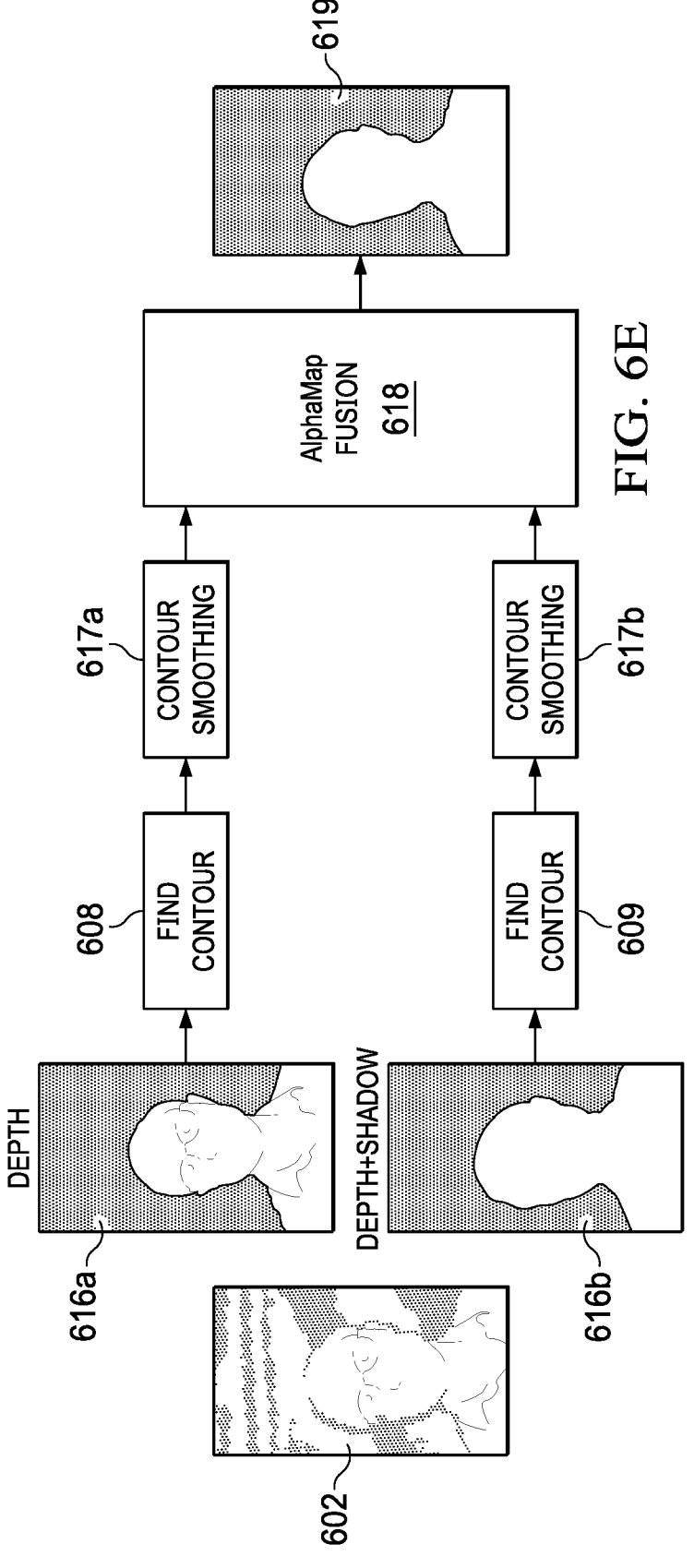

Referring to FIG. 6E, threshold 615 (e.g., at about 700 mm) is applied to histogram 614 to generate two binary depth mattes 616a, 616b for finding inner and outer contours of the subject, respectively. In an embodiment, threshold 615 can be selected to be the average distance between the outer most bin of the foreground bins (the bin containing pixels with the longest distances) and the inner most bin of the background pixels (the bin containing pixels with the shortest distances).

Although the segmentation of pixels described above uses a simple histogram thresholding method, other segmentation techniques could also be used including but not limited to: balanced histogram thresholding, k-means clustering and Otsu's method.

Referring again to FIG. 6E, steps 608, 609 extract the inner and outer contours of the subject from binary depth mattes 616a, 616b, respectively. A contour detection algorithm is applied to depth mattes 616a, 616b. An example contour detection algorithm is described in Suzuki, S. and Abe, K., *Topological Structural Analysis of Digitized Binary Images by Border Following*. CVGIP 30 1, pp. 32-46 (1985).

Depth matte 616a is generated using only defined depth data and depth matte 616b is generated using defined and undefined depth data (shadow data). If depth mattes 616a, 616b were to be combined into a single depth matte, the resulting combined depth matte would be similar to trimap 704 shown in FIG. 7C, where the grey region (referred to as the "blended" region) between the inner and outer contours included undefined depth data which may include important contour detail that should be included in the foreground.

After the inner and outer contours are extracted they can be smoothed using, for example, a Gaussian blur kernel. After the contours are smoothed, they are combined 618 into coarse depth matte 619, as described in reference to FIGS. 6F-6I.

Figure 6F:
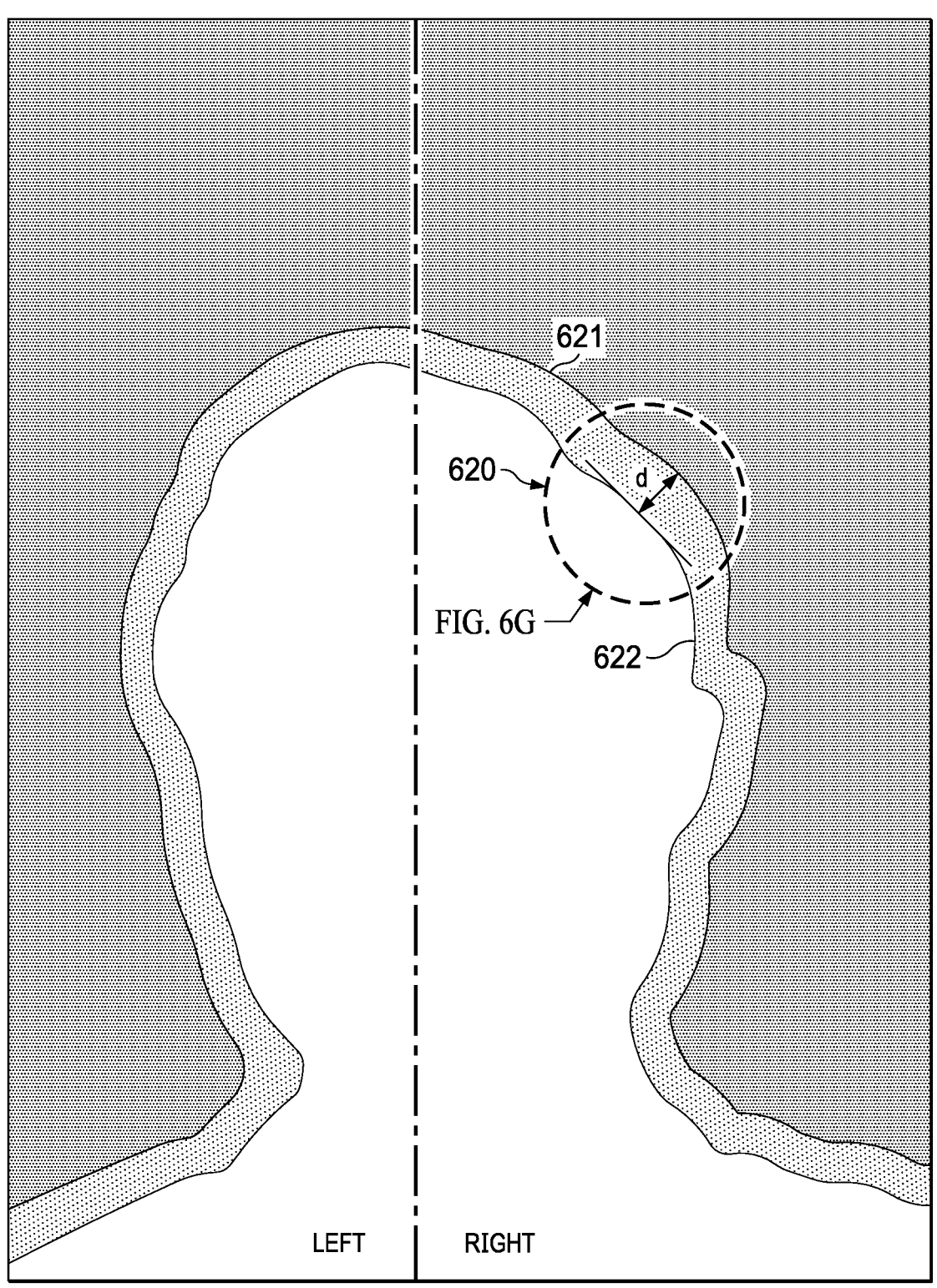

FIG. 6F illustrates the use of a distance transform to create coarse depth matte 619. Outer contour 621 and inner contour 622 bound a blended region of undefined pixels (undefined depth data) between the contours. In some instances, some of the undefined pixels may include important contour information that should be assigned to the foreground (assigned white pixels). To generate coarse depth matte 619, the subject is divided vertically into left and right hemispheres and a distance transform is performed on the undefined pixels in the blended region.

Figures 6G, 6H, 6I:
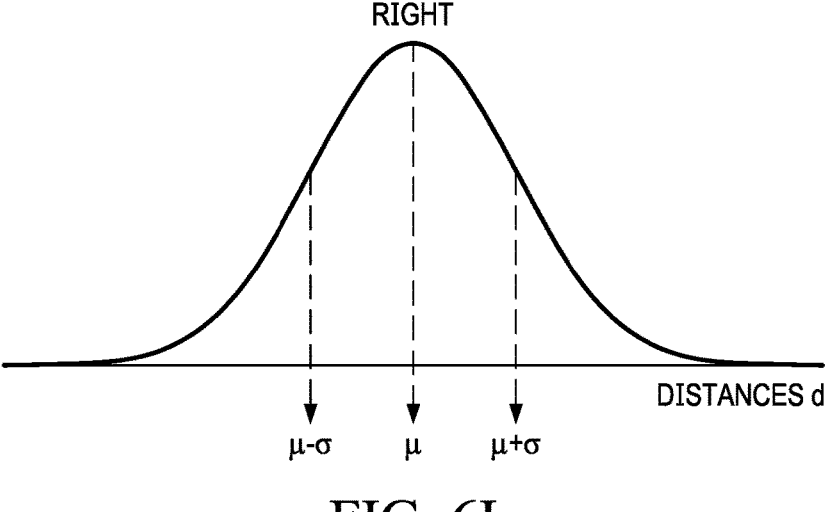
Figure 6J:
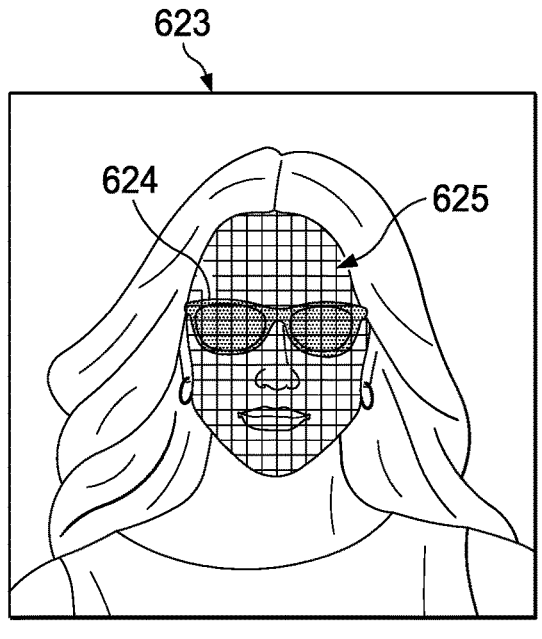
Figure 6K:
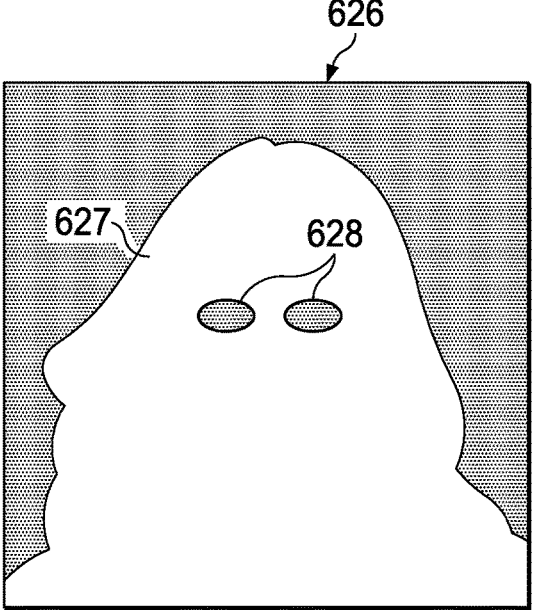
Figure 6L:
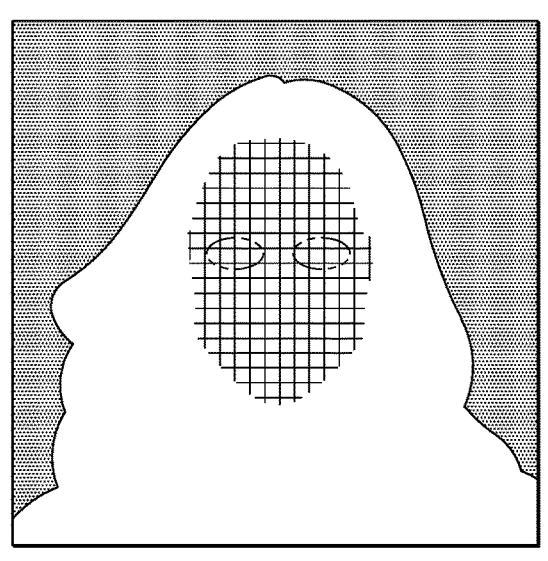

In an embodiment, perpendicular distances between pixels of inner contour 622 and outer contour 621 are calculated, as shown in FIGS. 6F and 6G. Next, probability density functions of the calculated distances are computed separately for the left and right hemispheres, as shown in FIGS. 6H and 6I. The left and right hemispheres have different probability density functions because, as noted earlier, the shadows on the left side of the subject's face are thicker than the shadows on the right side of the subject's face due to the offset between the IR projector and IR camera. In an embodiment, a Gaussian distribution model is applied to the distances to determine the mean $\mu$ and standard deviation $\sigma$ for each of the left and right hemispheres. The standard deviation $\sigma$, or a multiple of the standard deviation (e.g., $2\sigma$ or $3\sigma$), can be used as a threshold to compare against the distances in each hemisphere. The pixels in the undefined region (the grey region) in the left hemisphere are compared to the threshold for the left hemisphere. The pixels that have distances that are less than or equal to the threshold are included in the foreground and are assigned white pixel values. The pixels that have distances greater than the threshold are included in the background and are assigned black pixel values. The same process is performed for the right hemisphere. The result of the distance transform described above is coarse depth matte 619, which concludes preprocessing stage 603.

Example Region Growing/Face Mesh Processes

In some cases, the coarse matte 619 will have islands of undefined pixels in the foreground. For example, when a selfie is taken outdoors in the sunlight the performance of the IR depth sensor is degraded. In particular, if the selfie subject is wearing sunglasses, the resulting depth map will have two black holes where the eyes are located due to the sun's reflection off the sunglasses. These holes can be found in coarse depth matte 619 and filled with white pixels using an iterative region growing segmentation algorithm. In an embodiment, a histogram of foreground RGB video data 601 can be used to determine a suitable threshold value for region membership criterion.

Referring to FIGS. 6J-6L, 3D face mesh model 625 can be generated from the RGB video data 623. Face mesh model 625 can be used to identify the locations of facial landmarks on the subject's face, such as sunglasses 624. Face mesh model 625 can be overlaid on coarse depth matte 626 to identify the location of sunglasses 624. Any islands 628 of undefined pixels in foreground region 627 that are identified by face mesh model 625 are filled-in with white pixels so that the pixels are included in foreground region 627.

Figure 7A:
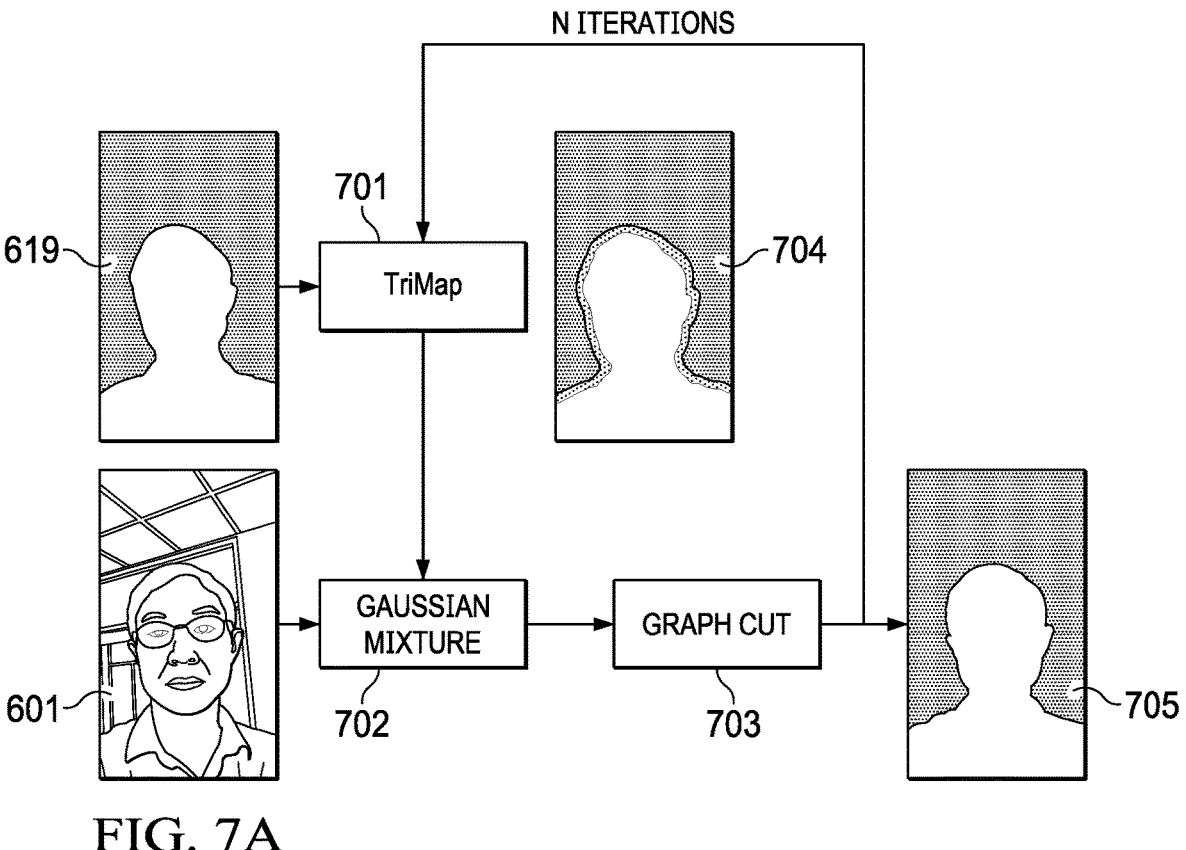
FIGS. 7A-7C illustrate a refined matting process using video data and the preprocessed (coarse) matte, according to an embodiment.
Figure 7B:
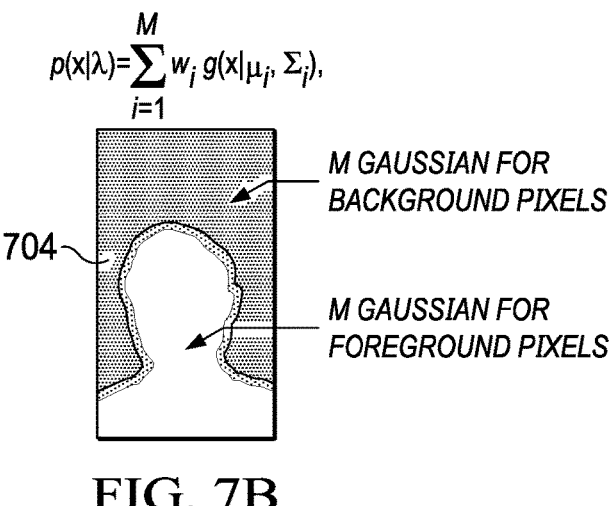

FIGS. 7A and 7B illustrate a process for RGB-D matting using a combination of RGB video data and the preprocessed depth matte 619, according to an embodiment. Referring to FIG. 7A, trimap module 701 generates trimap 704 from coarse depth matte 619. In an embodiment, trimap module 704 uses the same segmentation process used to generate trimap 704 as used to generate coarse depth matte 619 or some other known segmentation technique (e.g., k-means clustering). Trimap 704 has three regions: a foreground region, a background region and a blended region. Trimap 704 is input into Gaussian Mixture Model (GMM) 702, together with the RGB video data 601. GMM 702 models the foreground and background regions (See FIG. 7B) by a probability density function approximated by a mixture of Gaussians, as shown in Equation [3]:

$$p(x|\lambda) = \sum_{i=1}^{M} \omega_i g\left(x\middle|\mu_i, \sum_i\right). \qquad [3]$$

The probability density function is used by graph cuts module 703 to perform segmentation using an iterative graph cuts algorithm. An example graph cuts algorithm is described in D. M. Greig, B. T. Porteous and A. H. Seheult (1989), *Exact maximum a posteriori estimation for binary images*, Journal of the Royal Statistical Society Series B, 51, 271-279. The refined depth matte 705 output by graph cut module 703 is fed back into trimap module 701, and the process continues for N iterations or until convergence.

Figure 7C:
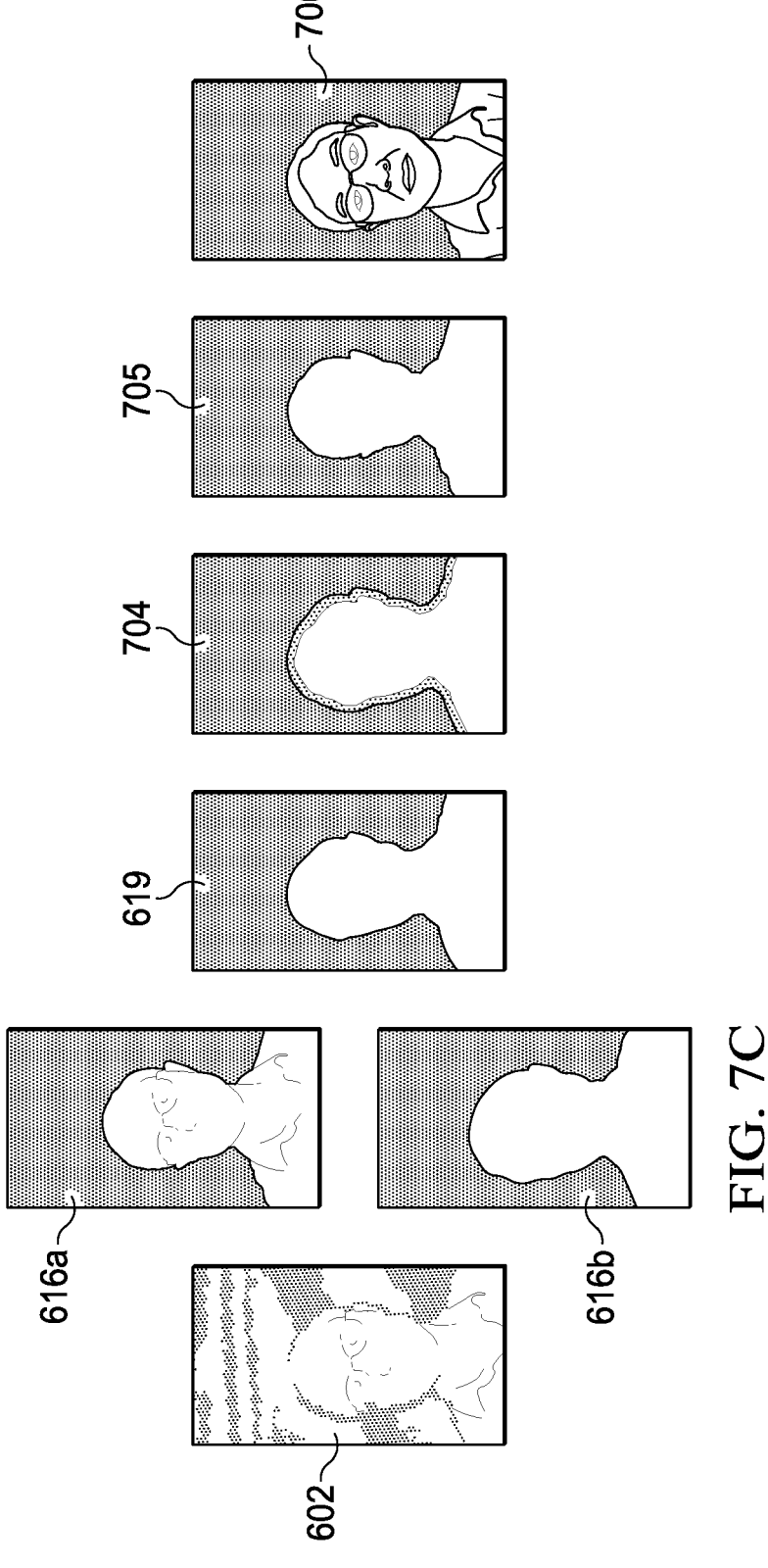

FIG. 7C shows the results of the previous two stages of matte generation process 600. A depth map 602 is preprocessed into binary depth mattes 616a, 616b, where depth matte 616a was generated using only defined depth data and depth matte 616b was generated using both defined and undefined depth data. Binary depth mattes 616a, 616b are then combined using a distance transform into coarse depth matte 619. Coarse depth matte 619 is input to an RGB-D matting process 604 that uses an iterative graph cuts algorithm and a GMM to model foreground and background regions of the trimap 704. The result of RGB-D matting process 604 is refined matte 705.

Figure 8:
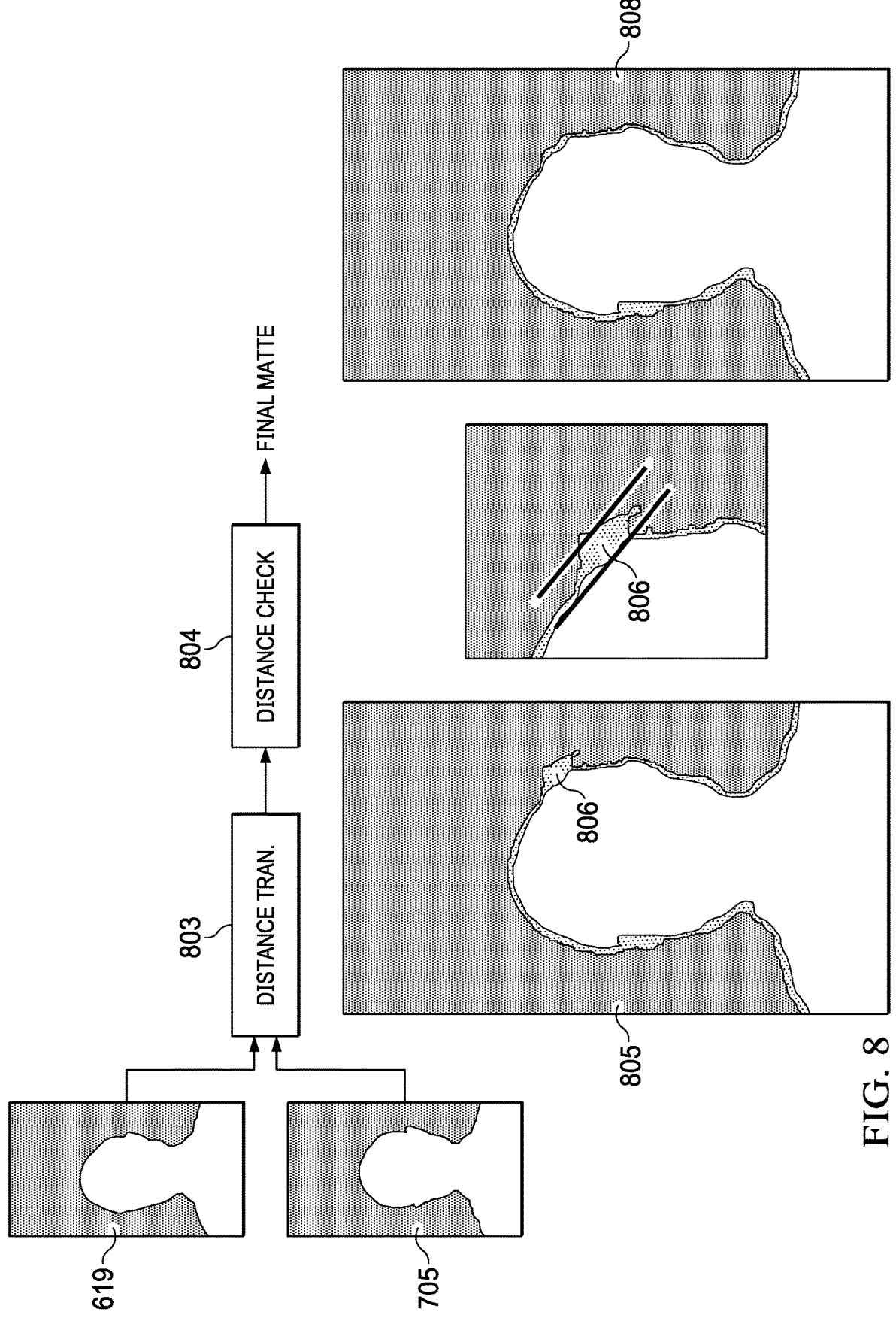
FIG. 8 illustrates a post-processing stage to remove artifacts from the refined matte, according to an embodiment.

FIG. 8 illustrates post-processing stage 605 to remove artifacts added by the refinement process, according to an embodiment. In post-processing stage 605, distance transform module 803 calculates distances between the contours in coarse depth matte 619 and refined matte 705 using the same techniques as described in reference to FIGS. 6F-6I. The distances are then compared to a threshold by distance check module 804. Any undefined pixels that are farther than a threshold from the inner contour are deemed artifacts and assigned to the background region. In the example shown, depth matte 805 includes artifact 806 before post-processing. The end result of post-processing stage 606 is the final AR selfie matte 808 used for compositing the AR selfie, as described with reference to FIG. 5. Note that artifact 806 has be removed from AR selfie matte 808 due to the post-processing described above.
Example Processes FIG. 9 is a flow diagram of process 900 for generating an AR selfie, according to an embodiment. Process 900 can be implemented using, for example, the device architecture described in reference to FIG. 11.

Process 900 can begin by receiving image data (e.g., video data) and depth data from an image capture device (e.g., a camera) and depth sensor (901), respectively. For example, the image data can be Red Green Blue (RGB) video data provided by an RGB video camera that includes an image of the subject. The depth sensor can be an IR depth sensor that provides a depth map that can be used to generate an RGB-Depth ("RGB-D") matte, as described in reference to FIG. 10.

Process 900 continues by receiving motion data from one or more motion sensors (902). For example, motion data can be acceleration data and orientation data (e.g., angular rate data) provided by an accelerometer and gyroscope, respectively. The motion data can be provided in the form of a coordinate transform (e.g., a body-fixed quaternion). The coordinate transform describes the orientation of the camera's view direction in a real-world reference coordinate system, which can be transformed into a virtual world reference coordinate system using a camera transform.

Process 900 continues by receiving a virtual background content (903) from storage. For example, the virtual background content can be a 2D image, 3D image or 360° video. The virtual background content can be selected by the user through a GUI. The virtual background content can be extracted or sampled from any desired virtual environment, such as a famous city or cartoon environment with animated cartoon characters and objects.

Process 900 continues by generating a virtual camera transform from the motion data (904).

Process 900 continues by generating a matte from the image data and depth data (905). For example, an RGB-D matte can be generated as described in reference to FIGS. 6I-6L. The RGB-D matte includes contour information for the subject and is use to compositing the RGB video with the virtual background content.

Process 900 can continue by compositing the image data, the RGB-D matte and the virtual background content (905), as described in reference to FIG. 5. During this step, the camera transform is used to extract or sample the appropriate virtual background content to composite with the image data and RGB-D matte (906). In an embodiment, one or more animation layers are also composited to provide, for example, animated particles (e.g., snowflakes, sparks, fireflies). In an embodiment, the camera transform is adjusted to account for camera flip caused by the user flipping between a forward-facing camera and a backward-facing camera and vice-versa, as described in reference to FIG. 3A.

Process 900 can continue by rendering for display composite media (e.g., a composite video) in a viewport of the mobile device (907). During a recording operation, the composite media is presented as a live video feed. When the user changes the view direction of the real-world camera, the virtual camera transform updates in real-time the virtual background content in sync with the real-world camera. The recorded AR selfie video can be played back from storage through the viewport and also shared with others on, for example, on social networks.

FIG. 10 is a flow diagram of process 1000 for generating an AR selfie matte, according to an embodiment. Process 1000 can be implemented using, for example, the device architecture described in reference to FIG. 11.

Process 1000 can begin by generating a histogram of depth data (1001) and applying threshold(s) to the histogram to segment depth data into foreground and background regions (1002).

Process 1000 continues by generating outer and inner contours of the subject into binary depth mattes (1003). For example, an inner contour can be generated in a first binary depth matte using a contour detection algorithm and defined depth data only, and the outer contour can be generated in a second binary depth matte using the contour detection algorithm and depth data that includes both defined and undefined depth data.

Process 1000 continues by optionally smoothing the inner and outer contours (1004). For example, the inner and outer contours can be smoothed using a Gaussian blur kernel.

Process 1000 continues by combining the outer and inner contours to generate a coarse matte (1005). For example, a distance transform using a Gaussian distribution can be used to combine the first and second binary depth mattes into a combined coarse matte.

Process 1000 can continue by generating a refined matte (e.g., an RGB-D matte) using the coarse depth matte, the image data and the depth data (1006). For example, an iterative graphic cuts algorithm can be used on a trimap generated from the coarse matte and a GMM to generate the RGB-D matte.

Process 1000 can continue by removing undefined regions and artifacts from the refined matte (1007). For example, islands of undefined pixels in the foreground region of the RGB-D matte due to sunglasses reflecting sunlight can be identified and filled with white foreground pixels using an iterative region growing algorithm and/or a 3D face mesh model, as described in reference to FIGS. 6J-6L.

Example Device Architecture

Figure 11:
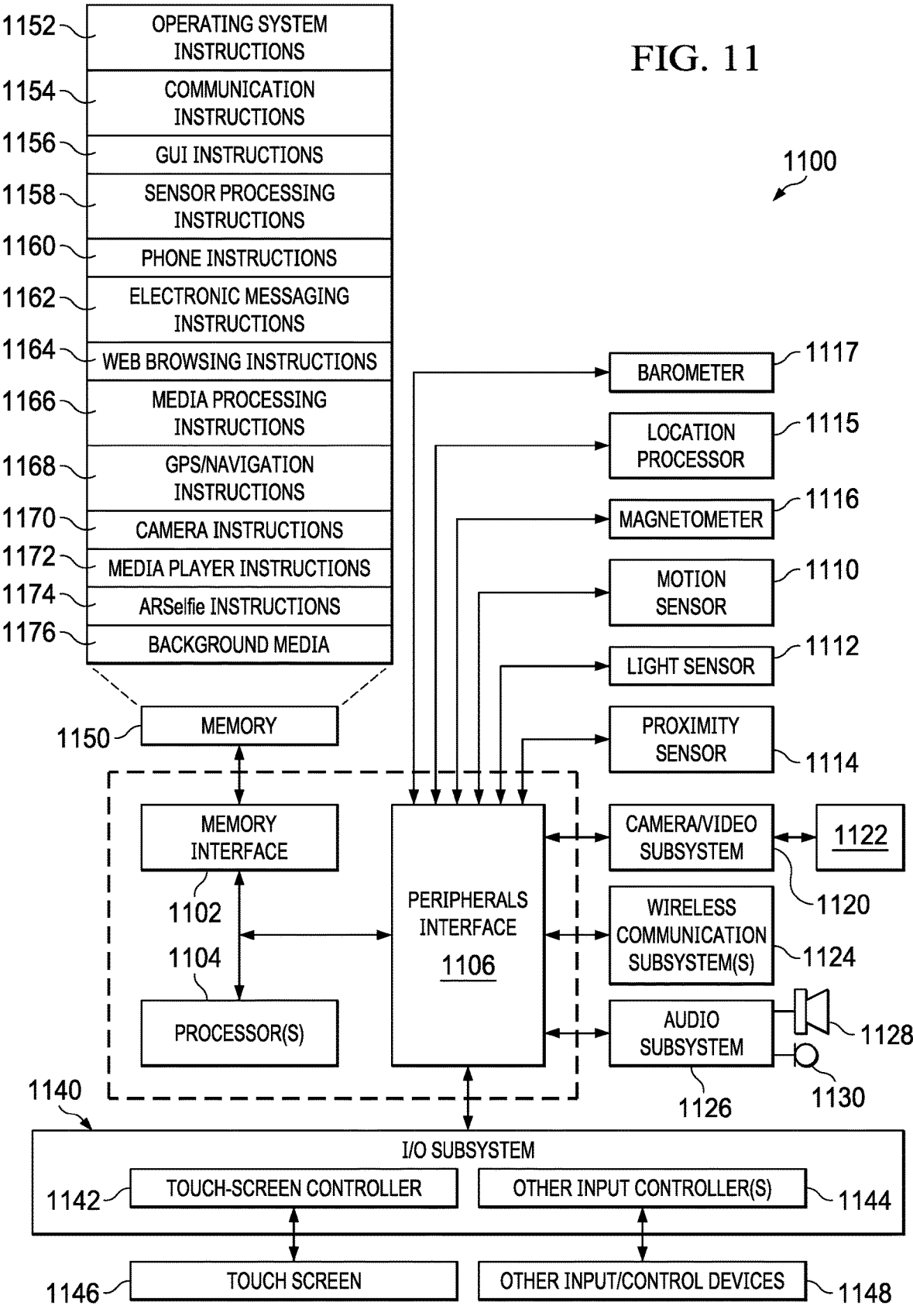
FIG. 11 illustrates device architecture for implementing the features and process described in reference to FIGS. 1-10, according to an embodiment.

FIG. 11 illustrates a device architecture for implementing the features and process described in reference to FIGS. 1-10, according to an embodiment. Architecture 1100 can include memory interface 1102, one or more data processors, video processors, co-processors, image processors and/or other processors 1104, and peripherals interface 1106. Memory interface 1102, one or more processors 1104 and/or peripherals interface 1106 can be separate components or can be integrated in one or more integrated circuits. The various components in architecture 1100 can be coupled by one or more communication buses or signal lines.

Sensors, devices and subsystems can be coupled to peripherals interface 1106 to facilitate multiple functionalities. For example, one or more motion sensors 1110, light sensor 1112 and proximity sensor 1114 can be coupled to peripherals interface 1106 to facilitate motion sensing (e.g., acceleration, rotation rates), lighting and proximity functions of the mobile device. Location processor 1115 can be connected to peripherals interface 1106 to provide geopositioning and process sensor measurements. In some implementations, location processor 1115 can be a GNSS receiver, such as a Global Positioning System (GPS) receiver chip. Electronic magnetometer 1116 (e.g., an integrated circuit chip) can also be connected to peripherals interface 1106 to provide data that can be used to determine the direction of magnetic North. Electronic magnetometer 1116 can provide data to an electronic compass application. Motion sensor(s) 1110 can include one or more accelerometers and/or gyros configured to determine change of speed and direction of movement of the mobile device. Barometer 1117 can be configured to measure atmospheric pressure around the mobile device.

Camera subsystem 1120 and one or more cameras 1122 (e.g. forward-facing camera and backward-facing camera) for capturing digital photographs and recording video clips, include videos and images used for generating an AR selfie, as described in reference to FIGS. 1-10.

Communication functions can be facilitated through one or more wireless communication subsystems 1124, which can include radio frequency (RF) receivers and transmitters (or transceivers) and/or optical (e.g., infrared) receivers and transmitters. The specific design and implementation of the communication subsystem 1124 can depend on the communication network(s) over which a mobile device is intended to operate. For example, architecture 1100 can include communication subsystems 1124 designed to operate over a GSM network, a GPRS network, an EDGE network, a Wi-Fi™ or Wi-Max™ network and a Bluetooth™ network.

In particular, the wireless communication subsystems 1124 can include hosting protocols, such that the mobile device can be configured as a base station for other wireless devices.

Audio subsystem 1126 can be coupled to a speaker 1128 and a microphone 1130 to facilitate voice-enabled functions, such as voice recognition, voice replication, digital recording and telephony functions. Audio subsystem 1126 can be configured to receive voice commands from the user.

I/O subsystem 1140 can include touch surface controller 1142 and/or other input controller(s) 1144. Touch surface controller 1142 can be coupled to a touch surface 1146 or pad. Touch surface 1146 and touch surface controller 1142 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 1146. Touch surface 1146 can include, for example, a touch screen. I/O subsystem 1140 can include a haptic engine or device for providing haptic feedback (e.g., vibration) in response to commands from a processor.

Other input controller(s) 1144 can be coupled to other input/control devices 1148, such as one or more buttons, rocker switches, thumb-wheel, infrared port, USB port and/or a pointer device such as a stylus. The one or more buttons (not shown) can include an up/down button for volume control of speaker 1128 and/or microphone 1130. Touch surface 1146 or other controllers 1144 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 1146; and a pressing of the button for a second duration that is longer than the first duration may turn power to the mobile device on or off. The user may be able to customize a functionality of one or more of the buttons. The touch surface 1146 can, for example, also be used to implement virtual or soft buttons and/or a virtual touch keyboard.

In some implementations, the mobile device can present recorded audio and/or video files, such as MP3, AAC and MPEG files. In some implementations, the mobile device can include the functionality of an MP3 player. Other input/output and control devices can also be used.

Memory interface 1102 can be coupled to memory 1150. Memory 1150 can include high-speed random access memory and/or non-volatile memory, such as one or more magnetic disk storage devices, one or more optical storage devices and/or flash memory (e.g., NAND, NOR). Memory 1150 can store operating system 1152, such as iOS, Darwin, RTXC, LINUX, UNIX, OS X, WINDOWS, or an embedded operating system such as VxWorks. Operating system 1152 may include instructions for handling basic system services and for performing hardware dependent tasks. In some implementations, operating system 1152 can include a kernel (e.g., UNIX kernel).

Memory 1150 may also store communication instructions 1154 to facilitate communicating with one or more additional devices, one or more computers and/or one or more servers, such as, for example, instructions for implementing a software stack for wired or wireless communications with other devices. Memory 1150 may include graphical user interface instructions 1156 to facilitate graphic user interface processing; sensor processing instructions 1158 to facilitate sensor-related processing and functions; phone instructions

1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GNSS/Location instructions 1168 to facilitate generic GNSS and location-related processes and instructions; and camera instructions 1170 to facilitate camera-related processes and functions for forward-facing and backward-facing cameras.

Memory 1150 further includes media player instructions 1172, and orientation-based, media presentation instructions 1174 for performing the features and processes described in reference to FIGS. 1-10. The memory 1150 may also store other software instructions (not shown), such as security instructions, web video instructions to facilitate web video-related processes and functions and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. Memory 1150 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed is:

1. A method comprising:

capturing, using a camera of a mobile device, image data of a subject in a real-world environment;

capturing, using one or more sensors of the mobile device, depth data indicating a distance of the subject from the camera in the real-world environment, the depth data including first depth data and second depth data that are distinct from one another;

generating a matte from the depth data, comprising:

projecting the depth data into a first binary depth matte including the first depth data, the first binary depth matte having a first foreground region and a first background region;

projecting the depth data into a second binary depth matte including the second depth data, the second binary depth matte having a second foreground region and a second background region;

obtaining, from the first binary depth matte, inner contour data corresponding to an inner contour of a foreground subject;

obtaining, from the second binary depth matte, outer contour data corresponding to an outer contour of the foreground subject, the inner contour data and the outer contour data bounding a blended region of the depth data; and generating a matte by combining the inner contour data and the outer contour data and including depth data in the blended region in one of a foreground region or a background region of the matte, wherein the foreground region of the matte includes the first foreground region and the second foreground region, and the background region of the matte includes the first background region and the second background region;

generating a composite image data, using at least the image data and the matte; and causing display of the composite image data on a display of the mobile device.

2. The method of claim 1, wherein the second depth data includes undefined depth data provided by the one or more sensors, and wherein the first depth data excludes the undefined depth data.

3. The method of claim 1, wherein projecting the depth data into the first binary depth matte or the second binary depth matte comprises:

generating a histogram of the depth data; and applying a threshold to the histogram to segment the depth data into the foreground region or the background region corresponding to at least one of the first binary depth matte or the second binary depth matte.

4. The method of claim 1, wherein generating the matte by combining the inner contour data and the outer contour data comprises:

calculating a first set of distances between the inner contour and the outer contour;

calculating (i) a first probability density function for a first subset of the first set of distances, and (ii) a second probability density function for a second subset of the first set of distances;

comparing a first set of blended depth data located in the blended region to one or more characteristics of the first probability density function;

comparing a second set of blended depth data located in the blended region to one or more characteristics of the second probability density function;

identifying depth data in the blended region that belongs in the foreground region based on results of the comparing; and adding the identified depth data to the foreground region.

5. The method of claim 1, wherein the matte is a coarse matte, the method further comprising:

generating a refined matte by applying an iterative segmentation process to the coarse matte.

6. The method of claim 5, further comprising:

identifying one or more holes in the foreground region comprising the second depth data using an iterative region growing process and a threshold determined by the image data; and assigning the second depth data to the foreground region.

7. The method of claim 5, further comprising:

identifying one or more holes in the foreground region comprising undefined depth data using a face mesh model generated by the image data; and assigning the second depth data to the foreground region.

8. The method of claim 7, wherein identifying the one or more holes in the foreground region further comprises:

using the face mesh to match the holes with sunglasses worn by the subject in the foreground region;

determining areas in the foreground region that overlap the face mesh; and filling in the holes based on the determined overlap.

9. The method of claim 5, further comprising:

combining the coarse matte and the refined matte into a combined matte;

identifying one or more artifacts in the combined matte; and using a distance transform to remove the one or more artifacts from the combined matte.

10. A system comprising:

one or more processors;

memory coupled to the one or more processors and storing instructions that, when executed, cause the one or more processors to perform operations comprising:

capturing, using a camera of a mobile device, image data of a subject in a real-world environment;

capturing, using one or more sensors of the mobile device, depth data indicating a distance of the subject from the camera in the real-world environment, the depth data including first depth data and second depth data that are distinct from one another;

generating a matte from the depth data, comprising:

projecting the depth data into a first binary depth matte including the first depth data, the first binary depth matte having a first foreground region and a first background region;

projecting the depth data into a second binary depth matte including the second depth data, the second binary depth matte having a second foreground region and a second background region;

obtaining, from the first binary depth matte, inner contour data corresponding to an inner contour of a foreground subject;

obtaining, from the second binary depth matte, outer contour data corresponding to an outer contour of the foreground subject, the inner contour data and the outer contour data bounding a blended region of the depth data; and generating a matte by combining the inner contour data and the outer contour data and including depth data in the blended region in one of a foreground region or a background region of the matte, wherein the foreground region of the matte includes the first foreground region and the second foreground region, and the background region of the matte includes the first background region and the second background region;

generating a composite image data, using at least the image data and the matte; and causing display of the composite image data on a display of the mobile device.

11. The system of claim 10, wherein the second depth data includes undefined depth data provided by the one or more sensors, and wherein the first depth data excludes the undefined depth data.

12. The system of claim 10, wherein projecting the depth data into the first binary depth matte or the second binary depth matte comprises:

generating a histogram of the depth data; and applying a threshold to the histogram to segment the depth data into the foreground region or the background region corresponding to at least one of the first binary depth matte or the second binary depth matte.

13. The system of claim 10, wherein generating the matte by combining the inner contour data and the outer contour data comprises:

calculating a first set of distances between the inner contour and the outer contour;

calculating (i) a first probability density function for a first subset of the first set of distances, and (ii) a second probability density function for a second subset of the first set of distances;

comparing a first set of blended depth data located in the blended region to one or more characteristics of the first probability density function;

comparing a second set of blended depth data located in the blended region to one or more characteristics of the second probability density function;

identifying depth data in the blended region that belongs in the foreground region based on results of the comparing; and adding the identified depth data to the foreground region.

14. The system of claim 10, wherein the matte is a coarse matte, the operations further comprising:

generating a refined matte by applying an iterative segmentation process to the coarse matte.

15. The system of claim 14, the operations further comprising:

identifying one or more holes in the foreground region comprising undefined depth data using a face mesh model generated by the image data; and assigning the second depth data to the foreground region.

16. The system of claim 15, wherein identifying the one or more holes in the foreground region further comprises:

using the face mesh to match the holes with sunglasses worn by the subject in the foreground region;

determining areas in the foreground region that overlap the face mesh; and filling in the holes based on the determined overlap.

17. The system of claim 15, the operations further comprising:

combining the coarse matte and the refined matte into a combined matte;

identifying one or more artifacts in the combined matte; and using a distance transform to remove the one or more artifacts from the combined matte.

18. One or more non-transitory storage media storing instructions that, when executed, cause one or more processors to perform operations comprising:

capturing, using a camera of a mobile device, image data of a subject in a real-world environment;

capturing, using one or more sensors of the mobile device, depth data indicating a distance of the subject from the camera in the real-world environment, the depth data including first depth data and second depth data that are distinct from one another;

generating a matte from the depth data, comprising:

projecting the depth data into a first binary depth matte including the first depth data, the first binary depth matte having a first foreground region and a first background region;

projecting the depth data into a second binary depth matte including the second depth data, the second binary depth matte having a second foreground region and a second background region;

obtaining, from the first binary depth matte, inner contour data corresponding to an inner contour of a foreground subject;

obtaining, from the second binary depth matte, outer contour data corresponding to an outer contour of the foreground subject, the inner contour data and the outer contour data bounding a blended region of the depth data; and generating a matte by combining the inner contour data and the outer contour data and including depth data in the blended region in one of a foreground region or a background region of the matte, wherein the foreground region of the matte includes the first foreground region and the second foreground region, and the background region of the matte includes the first background region and the second background region;

generating a composite image data, using at least the image data and the matte; and causing display of the composite image data on a display of the mobile device.

19. The one or more non-transitory storage media of claim 18, wherein the second depth data includes undefined depth data provided by the one or more sensors, and wherein the first depth data excludes the undefined depth data.

20. The one or more non-transitory storage media of claim 18, wherein generating the matte by combining the inner contour data and the outer contour data comprises:

calculating a first set of distances between the inner contour and the outer contour;

calculating (i) a first probability density function for a first subset of the first set of distances, and (ii) a second probability density function for a second subset of the first set of distances;

comparing a first set of blended depth data located in the blended region to one or more characteristics of the first probability density function;

comparing a second set of blended depth data located in the blended region to one or more characteristics of the second probability density function;

identifying depth data in the blended region that belongs in the foreground region based on results of the comparing; and adding the identified depth data to the foreground region.

21. The one or more non-transitory storage media of claim 18, wherein the matte is a coarse matte, the operations further comprising:

generating a refined matte by applying an iterative segmentation process to the coarse matte;

combining the coarse matte and the refined matte into a combined matte;

identifying one or more artifacts in the combined matte; and using a distance transform to remove the one or more artifacts from the combined matte.

* * * * *